235-380 SR
8/5/80 XR 4,216,375

United States Patent [19]

Ulch et al.

[11] 4,216,375

[45] Aug. 5, 1980

[54] SELF-CONTAINED PROGRAMMABLE TERMINAL FOR SECURITY SYSTEMS

[75] Inventors: Bryan D. Ulch, Valencia; Donald P. Sturgis, Claremont; Robert J. Fox, Los Angeles, all of Calif.

[73] Assignee: A-T-O Inc., Willoughby, Ohio

[21] Appl. No.: 19,733

[22] Filed: Mar. 12, 1979

Related U.S. Application Data

[62] Division of Ser. No. 874,283, Feb. 1, 1978.

[51] Int. Cl.$^2$ .................... G06K 5/00

[52] U.S. Cl. .................... 235/382; 235/380

[58] Field of Search .................... 235/375, 379, 380, 381, 235/382; 340/149 K, 149 A, 152 R

[56] References Cited

U.S. PATENT DOCUMENTS

| | | | |
|---|---|---|---|
| 3,857,018 | 12/1974 | Stark et al. | 235/381 |
| 4,097,727 | 6/1978 | Ulch | 235/382 |
| 4,142,097 | 2/1979 | Ulch | 235/382 |
| 4,150,781 | 4/1979 | Silverman et al. | 235/382 |

*Primary Examiner*—Daryl W. Cook

*Attorney, Agent, or Firm*—Knobbe, Martens, Olson, Hubbard & Bear

[57] ABSTRACT

A security system is disclosed which utilizes plural remote terminals for controlling access at plural locations throughout a secured area or building. Each of these remote terminals is capable of independent functioning, and includes a memory for storing plural independent identification numbers which define the personnel who will be granted access. These numbers stored in the terminal memories may be different from terminal to terminal, or may be uniform throughout the system, and may be the same as a list stored at a central processing location. Thus, access may be limited to the same group of individuals regardless of whether it is provided by a central memory list or a remote memory list. The remote memories provide total memory flexibility, so that the deletion of identification numbers from the list does not reduce the memory size. The memory, in addition to identification numbers, stores data defining real time access limitations for each of the individuals who will be granted access, so that flexibility in time of day access control is provided on a programmable basis.

14 Claims, 5 Drawing Figures

SELF-CONTAINED PROGRAMMABLE TERMINAL FOR SECURITY SYSTEMS

This is a division, of Ser. No. 874,283, filed Feb. 1, 1978.

BACKGROUND OF THE INVENTION

This invention relates to security systems, and, in the preferred embodiment, to magnetically encoded data card security systems in which access at a secured location is controlled by a comparison of data on a card inserted by personnel into the system with data stored in the system and defining those persons who shall be granted access. More particularly, this invention relates to a system in which, in addition to card data, keyboard data may be entered by persons wishing access, the keyboard data being in combination and permutation of the card data. In such a system, the present invention provides a substantially broader degree of flexibility in system control than was previously available, since it permits independent programming of terminals at each of plural remote locations in a system where the remote terminals, under normal circumstances, operate in conjunction with a central processor to regulate access. Thus, with this system flexibility, it is possible, even when communication is interrupted between the central processor and the remote terminals, to limit access at the remote terminals in accordance with either (a) the same identification list as is stored in the main memory, (b) a more stringent list, or (c) a more liberal list, as the user desires. Such flexibility has not heretofore been available. Furthermore, the ability to program a memory list to define who shall be provided access at each of the independent terminals, is accomplished in the present invention in a manner which permits identification numbers to be added and deleted from the system without affecting the system's memory capacity.

Security systems utilizing remote terminals to limit access at individual remote locations have, in the past, utilized static magnetic card readers at these remote locations for controlling access through electrically operable devices, such as doors, turnstiles, printers, etc. Prior art systems have been devised in which the remote card readers communicate with a central data processor or operate as stand-alone units.

The card or badge bearing encoded data used for controlling access is typically inserted into a slot of a reader which reads and decodes the data on the card. Advantageously, this data is encoded as a plurality of magnetically polarized spots in a sheet of magnetic material. Such encoded data normally includes an identification number or numbers identifying the card holder. During use, this number encoded by the card is compared with a number or numbers stored in the central computer terminal in multiterminal systems using central processors or at the remote locations in totally stand-alone systems, all to ascertain whether the individual inserting the card is entitled to access to a building, room, parking lot, or the like.

In one prior art embodiment, the magnetically polarized spots are used to directly actuate a reed relay or other moving switch mechanism located within the reader. In the state-of-the-art system, as is exemplified by U.S. Pat. No. 3,686,479 entitled "Static Reader System For Magnetic Cards", assigned to A-T-O, Inc., assignee of the present invention, electromagnetic solid state sensors are used. These sensors are disclosed and claimed in U.S. Pat. No. 3,717,749, also assigned to A-T-O, Inc. These patents are hereby incorporated in this disclosure by reference. Such systems have been found to be very reliable and are in use as access control systems in a number of different industries, universities, and government installations.

Operation of such systems as a part of a security network employing a central processor is disclosed and claimed in U.S. Pat. No. 4,004,134, also assigned to A-T-O, Inc., and also incorporated herein by reference. This latter system incorporates a central processor which periodically and sequentially polls each of the remote terminals in the system. The remote terminals are able to transfer data to the central processor only on receipt of a polling pulse. At the central terminal, data read at the remote location from an inserted card is compared with a master list which includes those persons who shall be given access at that remote location. Such systems, in the past, have permitted a limited degree of remote terminal operation, even is some or all of the interconnecting lines between the remote terminal and the central processor have been interrupted. The systems, however, generally require that a much simpler test be made of persons wishing entrance during such degraded mode operation, and thus the group of persons allowed access at such times is, of necessity, much larger than would normally be granted access. This is a distinct disadvantage in such systems, since it does not permit a controlled programmable access under all circumstances as is often required in secured locations.

An improved system for providing degraded operation in such a central processor-oriented system is disclosed and claimed in U.S. Pat. No. 4,097,727, entitled "Circuit For Controlling Automatic Off-Line Operation of An On-Line Card Reader," assigned to A-T-O, Inc., the assignee of the present invention, and incorporated herein by reference. Even in that improved system, there is no substantial system flexibility regarding the persons who will be granted access during degraded mode operation, and it is common in a system of that type to provide access during degraded mode operation to any person having a card coded for use within the overall security system, even if it is not coded for use at this particular remote location.

The communication lines used in a security system of this type, where a central processor is utilized for controlling the operation of plural remote terminals, provide an even greater level of security if the communication lines are monitored to assure that they are not tampered with and that their integrity is not degraded. A system for accomplishing this purpose is disclosed and claimed in U.S. patent application Ser. No. 827,994, filed Aug. 26, 1977, and entitled "System For Monitoring Integrity of Communication Lines In Security Systems Having Remote Terminals," this application being assigned to A-T-O, Inc., the assignee of the present invention and incorporated herein by reference.

It has also been known in the prior art to include at the remote location a keyboard. Typically such keyboard systems require that persons wishing access, in addition to the insertion of a magnetically encoded data card, are required to enter keyboard data, typically a sequence of digits. These digits have typically comprised a particular permutation and combination of the data encoded on the employee's card, the particular permutation and combination often being different for different remote terminals. Some prior systems have used hardwired permutation and combination circuits which did not pemit alteration after the system was installed. A more advanced keyboard system, which permits programming of the particular permutation and combination after installation, is disclosed and claimed in U.S. Pat. No. 4,142,097, entitled "Remotely Programmable Keyboard Sequence For A Security System", assigned to A-T-O, Inc., the assignee of the present invention and incorporated herein by reference.

While these systems disclosed in the prior art have provided a relatively flexible, sophisticated security network, certain persistent problems have remained unsolved. One of these problems involves the fact that systems utilizing a central processor invariably provided very broadly based access during degraded communication line operation. In addition, the prior art systems in which remote terminals are used to store lists of identification numbers for selective access have permitted changes in the access lists only at the expense of reduced memory size since, in the prior art, the elimination of an identification number from a memory storage location has typically required the destruction of that memory location.

In addition, those prior art systems which utilized real-time clocks for limiting access through a particular terminal to different personnel at different times of day, have been fairly limited in their flexibility and typically required that a person be issued a new entrance card or badge if his time of entry was to be changed. Such systems, therefore, greatly reduced the flexibility of real-time access control. In addition, such systems have not provided plural overlapping time zones so that various personnel could be provided access at different times of day which were not mutually exclusive.

SUMMARY OF THE INVENTION

The present invention solves these persistent problems in the prior art and provides, through their solution, an extremely powerful and flexible terminal system for secured access control. This system includes independent programmable identification listings at each of the plural remote locations of those individuals who will be granted access at such locations. In addition, the system permits connection of a plurality of these remote terminals to a central processor which includes its own programmable memory listing of personnel who will be provided access at each of the remote locations. During normal operation, when a central processor is used, this central memory is used to provide access at each of the remote locations, since the use of a central processor permits a printer to be added to the system, which printer provides a record of personnel movement throughout the system on a continuous basis. The central processor system also permits programming of each of the remote units from a central location and thus makes the system easier to control and to operate.

Nevertheless, any difficulty in communication between the central processor and the remote terminals in this system will not degrade the system operation, since a complete list of personnel who will be provided access is stored in a programmable memory at the remote location. Thus, when faulty communication lines are detected, the system interrogates its own memory for access control, and the person inserting a card at the remote terminal has no way of determining that the communication lines are impaired.

Furthermore, the system of the present invention provides a flexible, solid state programmable memory which is operated in a manner which maintains identification numbers in numerical order within the memory. Such numerical ordering permits a binary search to be conducted so that an efficient determination can be made to determine whether a particular number is stored in the memory. When a number is deleted from the memory, the remaining entries in the memory are shifted to close the data order so that no voids remain. Thus, the end of the memory can always be checked to determine whether there is room for additional identification numbers.

It will be appreciated, of course, that since the terminals of the present invention have the capability of such stand-alone operation, they can be used in a totally stand-alone application where no central processor is provided. Even in such an application, these terminals permit total programming flexibility at each of the remote locations. It will be appreciated that, utilizing a terminal of this type, a mixed system, some terminals centrally controlled and some operated as stand-alone units, is permissible utilizing the same terminal throughout the system. In addition, it is possible to install a plurality of stand-alone terminals with the expectation that, at a later date as system requirements increase, a central processor may be added to control the already installed stand-alone remote terminals.

Whereas in the prior art system which have time of day access control, a portion of a user's identification number typically included a time of day code, the present system utilizes such a time of day code only in combination with a user's identification number in memory. Thus, the user's card or badge does not itself define a time of day, and access at different remote locations may be provided using a single card at different times of day. In use, the present system responds to the insertion of a card by finding the user's identification number in memory and accessing an associated plurality of bits which determine the times of day at which access will be provided. If this defined time of day conforms with the time of day as monitored by real time clocks within the system, access will be provided. The time of day may be changed by changing each of plural clocks within the clock system itself. In addition, the particular clocks used for controlling access for each individual are programmable within the memory.

These and other advantages of the present invention are best understood through a reference to the drawings, in which.

Detailed Description of the Preferred Embodiment

Figure 1:
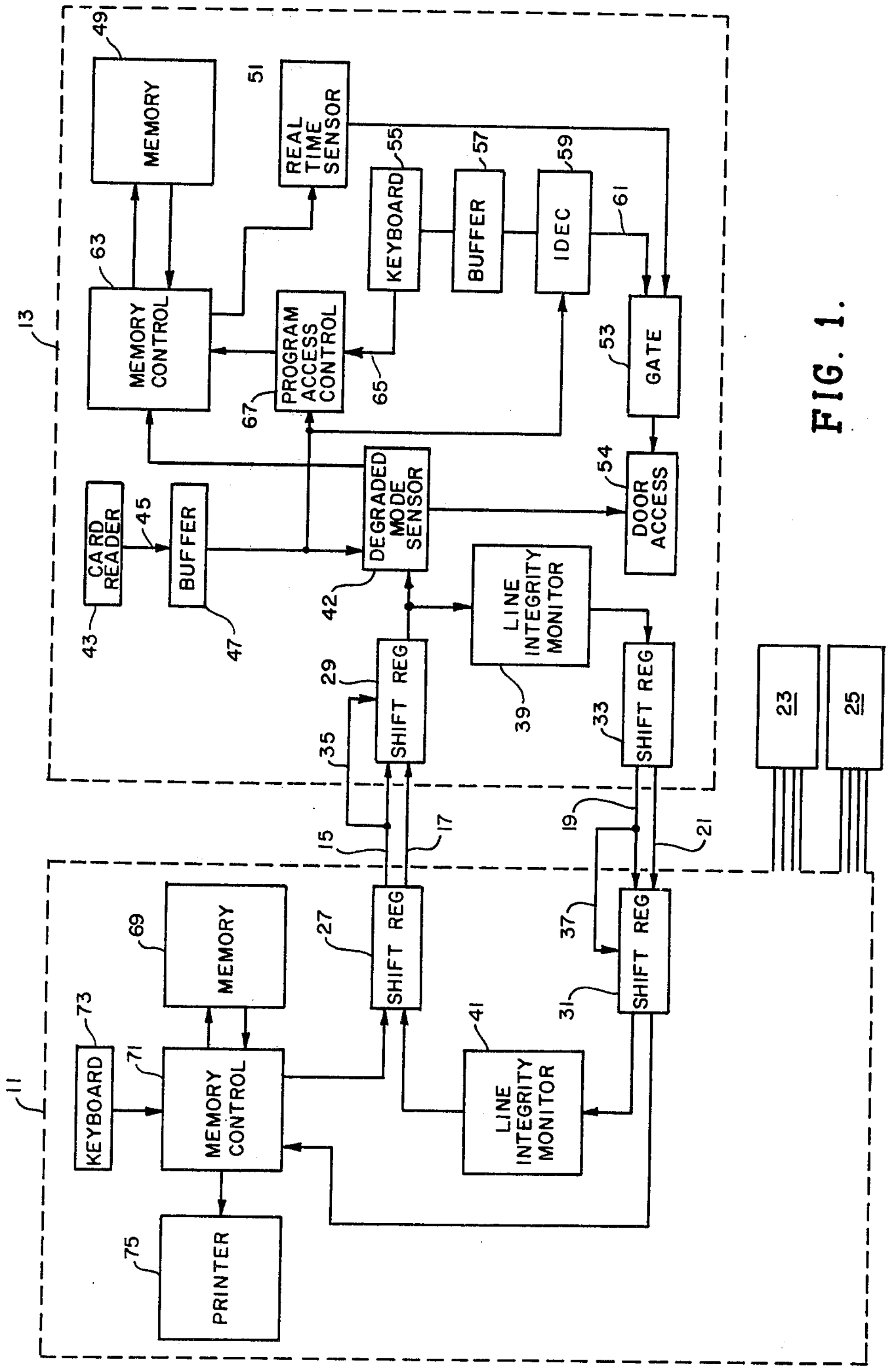
FIG. 1 is a schematic diagram of the overall system of the present invention showing the primary elements of a central processing unit and plural remote units.

Referring initially to FIG. 1, a central data processing unit 11 is shown connected to a particular remote terminal 13 by a pair of polling and data lines 15,17 and a pair of data lines 19 and 21. The polling lines 15 and 17, in a typical application, are unidirectional lines which enable the central data processing unit 11 to sequentially interrogate and send data to a plurality of remote terminals 13, 23, 25, etc. to determine which of these remote terminals require servicing. It will be understood throughout the remainder of the specification in this application that a large number of remote terminals may be connected to a single central processing unit 11 and that each of the remote terminals 23 and 25 performs substantially the functions described below with reference to the remote terminal 13.

It should be understood that the lines 15,17 are a line pair, the line 17, for example, providing a return for the line 15. Similarly, the line 21 provides a return for line 19. Polling signals and data which initiate at the central processor 11 are communicated to the remote terminal 13 on the line pair 15,17. Similarly, data signals produced at the remote terminal 13 are communicated to the central processor 11 on the line pair 19,21. It will be appreciated that words communicated on the line pairs 15,17 and 19,21 are most advantageously connected within the central and remote units 11,13 to shift registers 27–33. Thus, data sequentially clocked from register 27 onto lines 15,17 may be self-clocked, as shown by line 35 into shift register 29. Similarly, data sequentially clocked from the shift register 33 may be self-clocked, as shown by the connection 37, into the shift register 31.

Although the details of a line integrity monitoring system are not shown in FIG. 1 (in order to maintain the clarity of this disclosure), such a system is typiclly included in the communication system between the central processing unit 11 and the remote terminal 13, and is shown in FIG. 1 as a first line integrity monitor 39 within the remote terminal 13 interconnected between the shift registers 29 and 33, and a second line integrity monitor 41 in the central processing unit 11 interconnected between the shift register 31 and the shift register 27. The details of the line integrity monitoring circuits 39 and 41 are described in U.S. Pat. application Ser. No. 827,994, filed Aug. 26, 1977, mentioned previously. For the purpose of the present application, it is sufficient to understand that the line integrity monitoring system 41 cauases the shift register 27 to sequentially poll the remote terminals 13,23,25, etc. by sending a polling signal on the lines 15 and 17. The remote terminals 13,23,25, etc., through the line integrity monitoring circuitry 39, respond to these polling signals by providing a calculated, predetermined response which is transmitted by way of the shift register 33 and data lines 19 and 21 to the shift register 31. This data returned from the remote terminal and placed in a shift register 31 is compared by the line integrity monitoring circuit 41 to determine whether an appropriate response has been received from the remote terminal and to thus verify the integrity of the lines 15,17,19,21. It will be understood by those skilled in this art that the continued integrity of these data and communication lines is extremely important, since systems built in accordance with the present invention are used to limit personnel access and the line integrity monitoring circuit 39,41 can provide an alarm, for example, at the central processor 11, whenever an intruder (or other cuase) has interfered with the communication line network.

It is important to recognize at the outset of this disclosure that the remote terminal 13 is designed to operate as a stand-alone unit as well as a remote terminal for a central processor 11, and that it can therefore be utilized without the data communication lines 15 through 21, as described below.

A card reader or sensor 43, located in the remote terminal 13, substantially is described and claimed in U.S. Pat. Nos. 3,686,479 and 3,717,749, is used to sense magnetically encoded data on a card or badge inserted into the card reader 43. This data is transmitted, as by a line 45, to a buffer or storage register 47. In a typical system, the buffer 47 provides storage for five decimal digits, each of which can be any interger between zero and nine. The communication of these five digits requires four binary digits each, so that the interconnecting line 45, as well as the buffer 47, must be a 20-bit wide device. Data from the card inserted into the card reader 43 and supplying the 20 bits of information is typically placed into the register 47 in the same order in which it appears on the card or badge. In the system of the present invention, this data will either be compared with data in a memory 49 (in the remote unit 13) to determine whether the five-digit identification number is present in the memory 49, or will be compared with data stored in the central processor 11, if it is connected. A degraded mode sensor 42 is typically connected in series between the buffer 47 and the memory 49 and is used to selectively send data from the buffer 47 via the shift register 33 to the central processor 11 or directly to the memory 49, depending upon the mode of operation of the terminal 13. If the terminal 13 is is used as a stand-alone terminal, the degraded mode sensor 42 is bypassed so that the buffer 47 is linked directly to the memory system within the remote terminal. Alternatively, if the terminal 13 is used with a central processor, the degraded mode sensor 42 normally transmits data from the buffer 47 to the central processor unit via shift register 33 but can be used when the communication lines are degraded to transfer data from the buffer 47 directly to the memory 49 within the remote terminal. The degraded mode sensor may be substantially as described and claimed in U.S. patent application Ser. No. 830, 002, filed September 1, 1977, and referenced above.

If the memory 49 is being used, and stores an identification number identical to that in buffer 47, it will store, in conjunction with the number, a time code. This time code will be supplied by a memory control circuit 63, associated with the memory 49, to a real-time sensor circuit 51 which provides real-time input for the remote terminal 13. If the real-time input from the circuit 51 corresponds with the time data from the memory 49, the real-time circuit 51 will enable a gate 53 to provide access at the remote location, as through a door access control circuit 54.

In this system it is possible to provide, in addition to the memory 49, a secondary means for screening personnel for access. This mechanism includes a keyboard 55 attached to a buffer 57 and a circuit 59, referred to in FIG. 1 as an IDEC circuit. The IDEC circuit 59 is described in detail in U.S. patent application Ser. No. 830,004, filed Sept. 1, 1977 and referred to previously. For the purpose of the present application, it is sufficient to understand that the IDEC circuit 59 requires that the person requiring access at the door 54 must input a sequence of numbers at the keyboard 55, which is identical to a plurality of numbers read by the card reader 43, but altered in sequence. The IDEC circuit 59 respondes to the data from the buffer 47 as well as the data from the buffer 57 to assure that the proper digits in the proper sequence are input at the keyboard 55. An output from the IDEC circuit 59 on line 61 is required at the gate 53, along with the output from the time of day circuit 51, in order to provide access at the door 54. It should be noted that the IDEC system 59 within the terminal 13 may be used regardless of whether the memory 49 or the central processor 11 memory is used for identification number comparisons.

It will be understood by those skilled in the art that the buffer 47 does not communicate directly with the memory 49, but rather is connected to a memory control 63 which accesses data to and from the memory 49, and organizes the data in memory. This memory control 63 is connected to the keyboard 55 for programming purposes, as shown by line 65, which is connected in series with a supervisor's access circuit 67. The supervisor's access circuit 67 is connected to the buffer 47 and assures that, unless a supervisor's card has been inserted in the card reader 43, the keyboard 55 cannot be used to change the identification numbers or time zones stored in the memory 49. Thus, the keyboard 55 is connected to the IDEC circuit 59 at all times, but is connected to the memory control circuit 63 only when a supervisor's card is used. The supervisor's access module 67 is described and claimed in Patent Application Ser. No. 827,993, filed Aug. 26, 1977, and referred to above. Although not shown in detail in FIG. 1, it will be understood from the description in that application that the circuit 67 compares data from the buffer 47 with a register to determine whether a supervisor's card has been inserted at the card reader 43, and permits access to the write logic incorporated in the memory control 63.

As has been common in the prior art, the central processor 11 may include a memory 69 and memory control 71 as well as a keyboard 73. Thus, the central processor, by monitoring data received from the remote unit 13 and placed in the shift register 31, may be used to grant or deny access through appropriate polling signals supplied from the memory 69 to the shift register 27. While the use, in general, of such a system at the central processor 11 forms a part of the present invention, the details are well known. Thus, the programming of the memory 69 utilizing the keyboard 73 and control 71 may be substantially identical to the programming described below for the memory 49 utilizing the memory control 63 and keyboard 55 at the remote unit. Furthermore, it should be understood that, using the techniques for programming which are described below, and well known communication techniques, it is possible through the communication lines 15–21 to interconnect the keyboard 73 with the memory control 63 in a standard fashion, so that the keyboard 73 may be used to program the memory 49 in one of the remote units 13.

It will also be understood that it is common at the central processor 11 to include a printer 75, typically connected to the memory control 71, for making a permanent record of access authorizations and denials at each of the remote units 13, so that the flow of personnel throughout the security system can be monitored.

Figure 2:
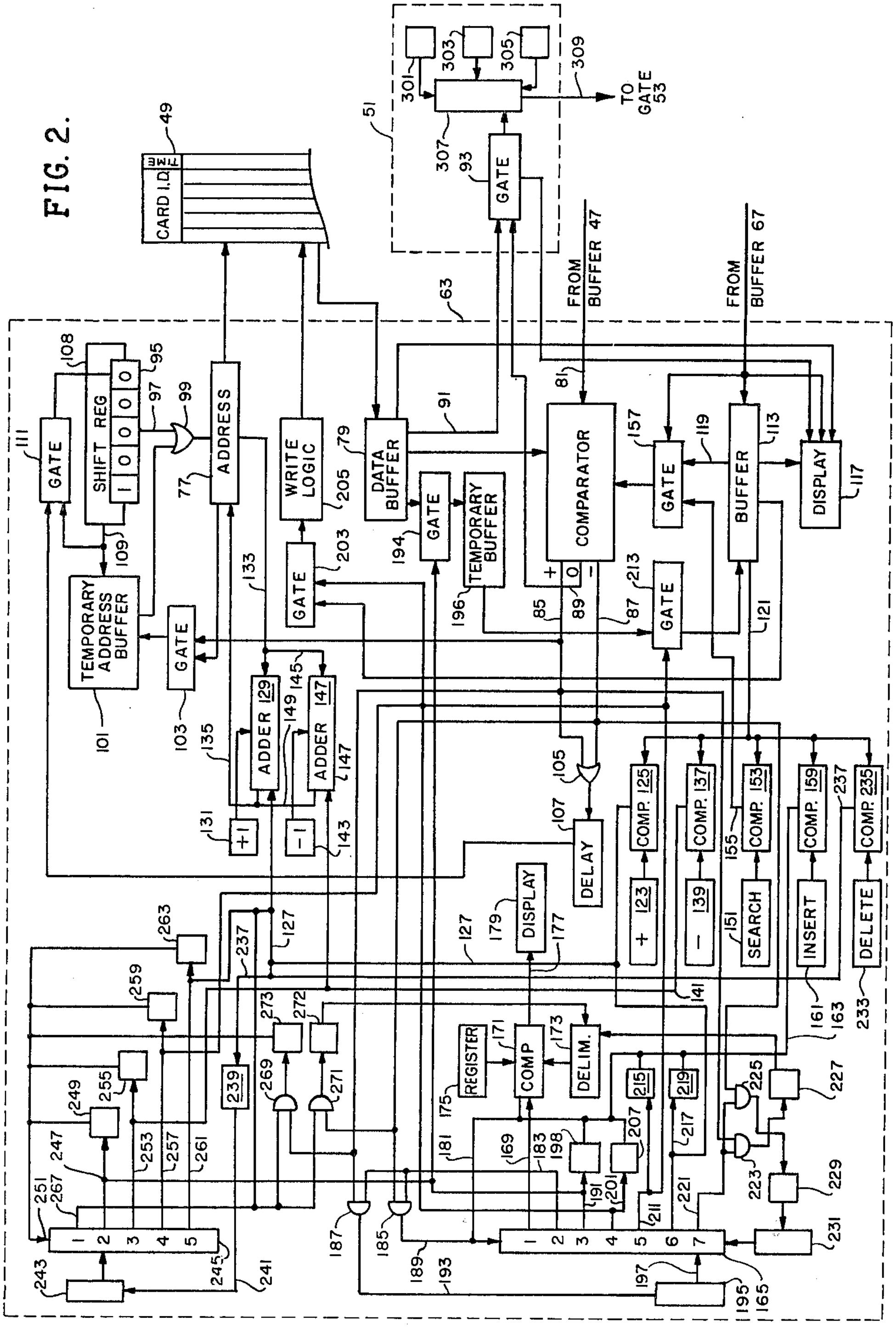
FIG. 2 is a more detailed schematic diagram showing the operation of the memory, memory control, and real-time sensor of the remote terminals of FIG. 1.

Referring to FIG. 2, the details of the memory 49, the memory control 63 as well as the real-time sensor 51 and its connections to the gate 53 and door access control 55, will be described.

The memory 49 is shown schematically in FIG. 2 to include five columns of card identification data digits and a single column of time code digits. The memory 49 stores in numerical sequence the five-digit identification numbers corresponding to the cards or badges of those personnel who are to be granted access at this remote terminal. Following each such identification number is a time code between 1 and 8 delineating the times of day when that particular individual is to be granted access. This time of day control will be understood in more detail through the description which follows.

The memory 49 is a read and write memory, or RAM memory, as is commonly used in digital circuits and is accessed by means of an address buffer 77 which forms a part of the memory control 63. A data buffer 79 is directly connected to the memory 49 and is used to access data from the memory 49 in accordance with the address 77. In the simplest utilization of the memory 49, data from the card reader buffer 47 is supplied on a line 81 to a comparator 83 which is also supplied with data from the data buffer 79. The comparator 83 is designated to provide a signal on a plus line 85 whenever the number accessed from the card reader buffer 47 is smaller than the data from buffer 79, to provide a signal on a minus line 87 whenever the data from the buffer 47 is larger than the data from the buffer 79 and to supply a signal on a zero line 89 when the data from the card reader buffer 47 is identical to the card identification data read from the data buffer 79. It will be understood that, since the time code data is not available from the buffer 47, only the card identification number portion, that is, the most-significant five digits, from the memory 49 is compared in the comparator 83. If the identification number from the buffer 47 is identical to the identification number accessed from the memory 49, indicating that the identification number from the card is present in the memory 49, a gate 93 is enabled to transfer the last four binary bits, conducted from the data buffer 79 on line 91, to the real-time sensor 51. This line 91 carries the decimal digit 1 through 8 which identifies the time code when access is to be permitted for this particular individual. The signal on line 89 enables the gate 93, indicating that the user's identification number is stored in memory.

It can be seen that the signal on line 89 is used to enable the gate 93 to access the time code data to the real-time sensor 51. Except on rare coincidences, the line 89 will not provide a signal, however, until a search for this identification number has been completed.

A search is accomplished as follows. In all cases, the address buffer 77 is initially accessed to the center location of the memory 49. This is accomplished by a shift register 95 which includes nine bit positions, eight of which are filled by consecutive zeroes and one of which is filled by a one. The binary 1 is in the most-significant bit position at the beginning of any data search. Thus, the binary number 1,0,0,0,0,0,0,0,0 is accessed on a line 97 from the shift register 95 and ORed in a gate 99 with a temporary address buffer 101 which, at the beginning of the search, stores the nine-digit binary number 0,0,0,0,0,0,0,0,0. This address is supplied to the address buffer 77 and selects the center position in the memory 49. In response to this accessing, the data buffer 79 is supplied with the center word in the memory 49, and this word is automatically compared with the identification number from the card data buffer 47. If the identification number, accessed at this central point from the memory 49, is smaller than the card identification number from the buffer 47, a signal will be produced on line 85 which will enable a gate 103 to supply the data from the address buffer 77 to the temporary address buffer 101. The temporary address buffer 101 in this instance will contain the word 1,0,0,0,0,0,0,0,0, designating the center location in memory 49. The signal on line 85 is also supplied through an OR gate 105 to a delay 107 which in turn clocks the shift register 95.

The shift register 95 is made recirculating by the connection 108, and the 1 in the most-significant bit position is thus clocked to the second most-significant bit position. If, on the other hand, the number accessed at the central location in the memory 49 is larger than the identification number from the buffer 47, a signal will be produced on line 87 which will recirculate (using gate 105 and delay 107) by one bit the shift register 95, but will not enable the gate 103. The number in the address buffer 77 will thus not be supplied to the temporary address buffer 101.

This searching routine continues so that each time that the comparator 83 produces a plus or minus output signal on line 85 or 87, the binary number in the shift register 95 is circulated by one count. The circulated number in this register 95 is ORed with the temporary address buffer 101, to change the address buffer 77 and thus address a new location in the memory. At the same time, the temporary address buffer is supplied with the additional digit from the shift register 95 only if the output from the comparator 83 indicates that the data is at a higher address location in the memory 49. Thus, the search continues, one bit at a time, in a normal binary search fashion. At each step, the next most-significant bit of the address buffer 77 is made a one if the data is at a higher address in the memory 49. Alternatively, the next most-significant bit of the address buffer 77 is made a zero if the data is at a lower address in the memory 49. This selective addressing is accomplished by either enabling or not enabling, respectively, the gate 103. Ultimately, this search process will locate the position in memory 49 at which the data from the buffer 47 should be stored, and if such data is stored in the memory 49, the data buffer 79 will store the same card identification number as is accessed on line 81, so that a zero signal will be produced on line 89 to gate the time code to the real-time sensor 51. Alternatively, if the search is completed, so that a binary one exists in the least-significant bit position of the shift register 97, this bit will be shifted on the last signal from the dealy 107 to the most-significant bit position. As the one digit is thus shifted by the line 108, it is coupled by line 109 to temporarily disable a gate 111 which temporarily prohibits signals from the OR gate 105 from again actuating the shift register 95, and the search is thus terminated. This same signal on line 109 is used to clear the temporary address buffer 101.

If the search terminates without a zero signal being provided on line 89 from the comparator 83, no signals are produced which will enable the gate 93, and access will not be permitted to the card holder. Obviously, at any time during the search that a zero signal is produced, the search stops, since no signal is supplied to the OR gate 105, and access is immediately permitted if the time of day code compares favorably with the real time, as will be explained in more detail below.

The remainder of the circuitry associated with the memory control circuit 63 is utilized primarily for programming the memory 49 to add or delete identification numbers from the memory 49 or to search the memory 49 for programming purposes, so that the system user may provide access at this remote location for only selected personnel. As previously explained, a supervisor's card is utilized to provide program access, and this access supplies keyboard data from the program access control circuit 67 to a buffer 113, shown in FIG. 2. In a number of cases, the programmer will utilize the keyboard to place an identification number in the buffer 113, followed by a code indicating the operation to be conducted. Thus, for example, the programmer may place an identification number in the buffer 113 and utilize an additional keystroke to indicate that this identification number is to be inserted into the memory, so that an additional employee will be granted access. Alternatively, the additional keystroke may be used to delete this number from memory or simply to search the memory for this number. In some cases, only a single keystroke is used, as, for example, when the programmer wishes to simply increment or decrement the memory address register 77.

Whenever signals are present on line 67 indicating that program access control has been granted, a line 115 coupled to line 67 enables a display 117, the first five digits of which, that is, the identification number digits of which, are provided by the buffer 113. The last digit, reserved for the time code digit from the memory 49, is supplied by the line 91 to the display 117. Thus, the programmer can see the identification number that he keys into the buffer 113, but his last keystroke which indicates the operation he wishes to perform, will not operate the display 117. Rather, the last keystroke will begin a search or other operation which will result in data being placed in the data buffer 79. Ultimately, the last digit of the display 117 will indicate the results of the search or other step by displaying the last digit from the data buffer 79.

The identification number from the buffer 113 is coupled by a line 119 to the comparator 83, while the least-significant bit is coupled by a line 121 to a plurality of comparators. If the least-significant keystroke identifies a memory address incrementing step, data identical to the keystroke is supplied by a buffer 123 so that a comparator 125 supplies a signal on line 127 to an adder 129 which adds unity from a register 131 to the current value of the address buffer 77, as supplied on line 133, and supplies the sum back to the address buffer 77 on line 135. Thus, each time that this keystroke is entered, the address in register 77 is incremented by one location, as required by the programmer. In a similar fashion, a decrementing keystroke will compare favorably in a comparator 137 with data from a buffer 139 to provide a signal on line 141 to add a minus one in a buffer 143 to the value in the address buffer 77, as accessed on line 145, so that an adder 147 provides on line 149 a decremented address, permitting the programmer to decrement the memory location address in register 77 for programming purposes.

If the programmer utilizes a keystroke which requires a search of the memory 69, after first introducing an identification number into the buffer 113, a search routine will be implemented which will search the memory 49 to determine whether the identification number in the buffer 113 exists in the memory 49 and, if so, during what time zones that individual is allowed access. This is accomplished by first comparing the keystroke data with a search keystroke indication in a buffer 151, so that a comparator 153 provides a signal on line 155 to enable a gate 157 which supplies the identification number from the buffer 113 to the comparator 83. The comparator 83 then initiates a search routine in a binary fashion, as previously described, to ultimately provide on lines 91 the decimal digit indicating the time access code for this particular identification number, which time access code will be displayed on the display 117 along with the identification number which was searched. If the identification number is not in the memory 49, a zero output signal on line 89 will not be produced by the comparator 83, and the gate 93 will not be enabled. Thus, no display will appear in the least-significant bit position of the display 117. Alternatively, the system could be designed to provide a zero in the least-significant bit position of the display 117 if the searched identification number is not present in the memory 49.

If, as the least-significant bit after the insertion of an identification number in the buffer 113, the programmer depresses a key which provides an instruction to insert this identification number as a new or additional identification number in the memory 49, a comparator 159 will provide an output signal because of identity between the keystroke data and data from a buffer 161, the signal being provided from the comparator 159 on line 163 to initiate the operation of a counter 165. This operation is initiated by placing the pulse on the clocking input 167 of the counter 165 so that the counter counts to its first position, placing an output signal on a 1 count line 169. When a signal is present on line 169, a comparator 171 compares a delimiter register 173 with a register 175 which stores a count equivalent to the last storage location in the memory 49. The delimiter register 173, as will be understood through the following description, is continuously updated so that it stores a number equal to the number of words stored in the memory 49. When the number in the delimiter register 173 is equal to the number stored in the register 175, this is an indication that the memory 49 is full and the comparator 171 will produce a signal on line 177 to energize a front panel display 179 indicating to the programmer that the memory is full, and that no additional identification numbers should be inserted without first deleting some identification numbers. Furthermore, the full memory indication is not connected to clock the counter 165, so the insert routine will not continue.

If the memory 49 is not full, the comparator 171 will produce a signal on line 181 indicating that the registers 173 and 175 did not store equal numbers. This signal on line 181 is used for clocking the counter 165 to its second count position, producing a signal on line 183. The programmer will have been told that, prior to an insert operation, a search operation should be conducted using the comparator 153 so that, at the time the insert operation is conducted, the address buffer 77 will be addressing the memory 49 at a location immediately preceding or immediately following the location where the new identification number should be inserted. At the end of the search routine, the comparator 83 will provide a plus signal on line 85 if the new data word should immediately precede the present location of the address buffer 77 or a minus signal if it should immediately follow this word. During the insert routine, the output lines of the comparator 83 are checked at the second clock position by ANDing the line 183 in gates 185 and 187 with the minus line 87 and plus line 85, respectively, from the comparator 83. If the minus line 87 contains a logic signal, the AND gate 185 produces an output signal on line 189 to again clock the counter 165 to produce an output signal on its 3-count line 191. If, on the other hand, the plus line 85 is at a positive level, the AND gate 187 will provide a signal on line 193 to a buffer 195 enabling that buffer 195 to input on a plurality of lines 197 to the counter 165 a 6-count, so that the counter 165 will jump from its 2-count position to its 6-count position. This latter step is necessary so that if the new data word is to be stored at the next data position in memory 49 (a plus signal on line 85), a routine will be implemented which skips a data position in the memory 49. If, on the other hand, the present data position where the address buffer 77 presently points is not to be skipped (since the new data word is to go at this present position), the next series of steps between count 2 and count 6 of the counter 165 are used for removing and temporarily storing the presently addressed word from the memory 49, as will be seen from a description of these steps.

When the signal on line 189 clocks the counter 165 to its three count, the signal on line 191 enables a gate 194 so that data from the data buffer 79 is accessed in parallel to a temporary storage buffer 196. This step is used to save the identification number in the current memory location. It will be seen as this description follows that the current memory location is stored in the next lower memory location, while the word from that lower position is, in turn, stored in the next succeeding lower position. Thus, when a new word is placed in memory 49, the counter 165 is used to sequence a repeating routine which shifts the remaining data in the memory 49 toward the bottom of the memory 49 by one step, making room at the proper location in numerical order for the newly added data word.

Once the current identification number has been stored in the temporary register 196, a delay 198 connected to the line 191 is used to clock the counter 165 to its 4-count position. This 4-count position provides a signal on line 201 which enables a gate 203 connecting the buffer 113 to write logic 205 associated with the memory 49. Thus, at count 4, the data previously stored in the current memory location is automatically erased and the new identification number is written in this storage location. A delay circuit 207 connected to the line 201 is used to again clock the counter 165 at the completion of this writing operation so that the counter produces a 5-count output on line 211 which accesses the data word from the temporary buffer 196 into the buffer 113, erasing the number previously stored in the buffer 113, by enabling a gate 213 interconnecting these buffers. This places the number previously stored in the memory 49 (which was removed to make room for the new word) into the buffer 113, so that, on the next circulation of the counter 165, it can be written into the next successive location in the memory 49.

Figure 3:
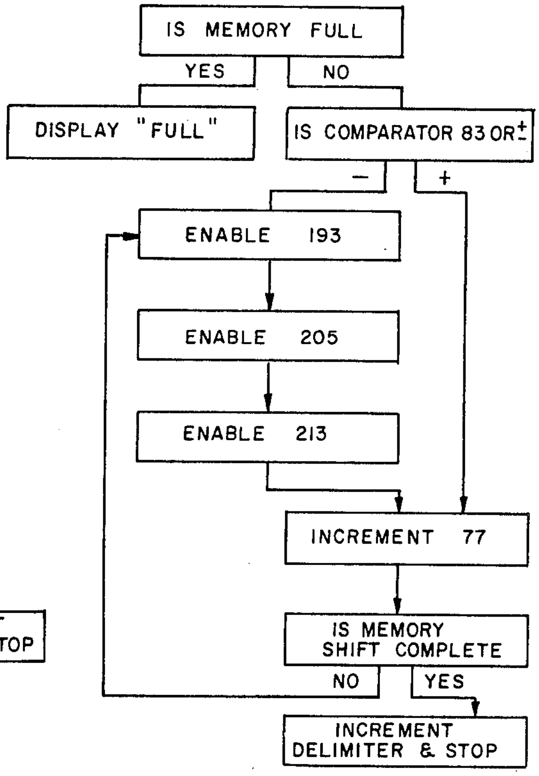
FIG. 3 is a flow chart showing the operation of an insertion loop counter and its associated electronic elements, all of which are shown in FIG. 2.

A delay 215 connected to line 211 clocks the counter 165 after the data has been accessed into the buffer 113 and the counter 165 then provides a 6-count output on line 217 which is connected to line 127 to increment the addressed location in the memory 49 as previously described. The line 217 is additionally connected through a delay 219 to clock the counter 165 to its seventh and final output position. It will be recognized that, at the sixth count position, the signal on line 217 incremented the memory 49 location so that the next successive memory word is being accessed. This memory word should be larger than the word currently in the buffer 113, unless we have reached the end of the data in the memory 49, in which case the new word would be 0,0,0,0 and thus smaller than the word stored presently in the buffer 113. Thus, the signals on lines 85 and 87 can be utilized to determine whether the insert routine should stop. The signal on line 221, indicating count 7, is ANDed with the signal on line 85 in AND gate 223 and with the signal on line 87 in AND gate 225. If the AND gate 223 produces an output signal, this signal is connected to an incrementing circuit 227 which is, in turn, connected to increment the delimiting register 173 adding one count to this register. If, on the other hand, the memory transfer operation has not been completed, the output signal from gate 225 will be used, through a delay 229, to clock the counter 165 back to its 3-count position by utilizing a 3-count register 231 to place a count of three in the counter 165. Thus, the sequence continuously loops through counts 3 through 7 until each of the words in the memory 49 has been shifted down one count, and the delimiter register 173 has been incremented. This entire insert routine is shown in the flow chart of FIG. 3. It can be seen from that flow chart that each element of memory data is shifted toward the end of the memory by one position to make room for the new element. The delimiter is then incremented and the process comes to a stop.

Figure 4:
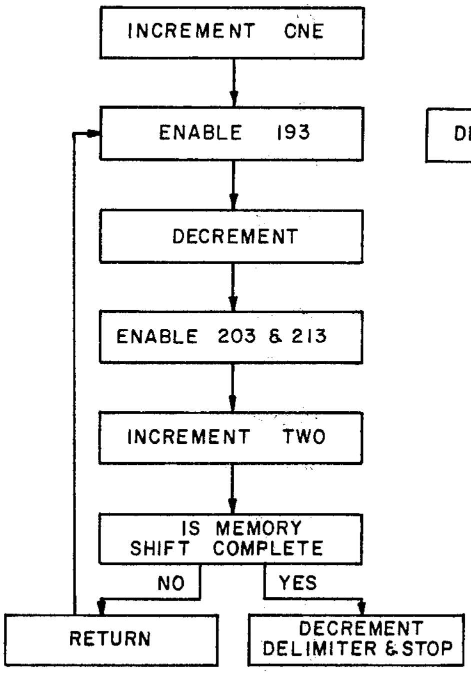
FIG. 4 is a flow chart showing the sequential operation of a deletion loop counter and its associated electronics, all as shown in FIG. 2.

A similar process is generated by a keyboard keystroke which provides on line 121 a delete signal which compares favorably with a delete word stored in a buffer 233. This sequence is shown in the flow chart of FIG. 4 and can be followed there as well as in the schematic diagram of FIG. 2. Signals from the comparator 235 connected to the buffer 233 indicate that a keystroke demanding a data element deletion from the memory 49 has been made. This signal on line 237 is used to provide the initial input to a counter 245 used to sequence the deletion process. During the data deletion process, it is desired to delete the element of data located during a search operation and to shift all of the remaining data within the memory 49 to close the gap. Thus, the remaining data in the memory 49 must be moved up in the memory by one data position, and the delimiter 173 must be decremented by one count.

This is accomplished by utilizing the signal on 237 to initially increment the address buffer 77 by providing a signal on line 127. A delay 239 is used to assure that this incrementing has been accomplished, and then provides a signal on line 241 to enable a buffer 243 storing a 2-count to input this 2-count into the counter 245 used for sequencing the deletion process. In response to the 2-count from the buffer 243, the counter 245 provides a 2-count output on line 247 which reads the data word at the incremented location into the temporary buffer 196 by enabling gate 194. In addition, through a delay 249, the signal 247 increments the counter 245 at its clocking input 251. The counter 245 then provides a 3-count output on line 253 which is connected to line 141 to decrement the address in the buffer 77. Line 253 is additionally connected through a delay 255 to clock the counter 245 to a 4-count position producing a signal on line 257. This signal is used to enable gates 213 and 203 to access the data from the temporary buffer 195 to the write logic 205. This logic 205 then writes the word in the temporary buffer 195 into the memory location addressed by the buffer 77 in the memory 49. The signal on line 257, in addition, provides a delayed output from a delay circuit 259 to clock the counter 245 to its 5-count position which provides a signal on line 261. Line 261 is connected to the line 127 to increment the address buffer 77. This signal is also delayed in a delay circuit 263 to provide an additional clocking input to the counter 245. In response to this additional clocking input, the counter 245 provides a 1 output on line 267 which is connected to line 127 to increment the address buffer 77 a second time, and is additionally ANDed in gates 269 and 271 with the plus signal 85 and minus signal 87. If a minus signal 87 is present, the end of search has been reached and the delimiter register is decremented by decrementer 272. If a plus signal is present, the gate 269 provides, through a delay 273, a clocking input to the counter 245 to repeat the data shifting process on the next data word. It can thus be seen that the counter 245 is used to sequence a repeating cycle of steps which are used as a looping function to shift all of the data words in the memory one step toward the beginning of the memory in order to close the gap in the memory which results from deleting a data word therefrom. The flow chart of FIG. 4 diagrams this process utilizing element numbers from the schematic of FIG. 2.

When, in the course of a searching operation, an identification number is located, it was explained previously that the data buffer 79 provides, through gate 93, a 4-bit output indicating the time of day when access is to be provided for the person having this identification number. This number is accessed by the real-time sensor 51 which, as shown in FIG. 2, includes three separate clocks, 301, 303, and 305, each of which can provide the closure of switch in response to a particular time of day setting. Thus, for example, the clock 301 may be set to provide a switch closure from 8:00 A.M. to 5:00 P.M, the clock 303 from 5:00 P.M. to midnight, and the clock 305 from midnight to 8:00 A.M. These three clock switches are accessed to a comparator 307 which is, in turn, provided with signals from the gate 93. If the signals from gate 93 conform to the switch closures from the clocks 301 through 305, access is permitted by placing a signal from the comparator 307 on line 309 to gate 53. In a typical arrangement, the comparator 307 will provide an output signal on line 309 if any one of the clocks 301–305 is providing a switch closure and the signal from gate 93 has a 1-bit on the corresponding line indicating that this employee is to be provided access at the time of day indicated by this switch closure. It can be seen that by setting the clocks 301–305 and by giving a particular employee access at combinations of times from 1, 2, or 3 of these clocks, total flexibility in timing control can be achieved. Furthermore, by providing a time code on the fourth line from the gate 93, the comparator 307 can be made to provide an output signal on line 309 at any time of day, irrespective of the condition of the clocks 301 through 305, so that, for example, supervisory personnel can be granted access at all times.

Referring once again to FIG. 1, it bears repeating that the remote terminal 13 of the present invention will operate utilizing its own memory 49 and memory control 63 in the manner described. Alternatively, this same remote unit can be utilized by accessing data directly from the buffer 47 through the degraded mode sensor 42, shown in FIG. 1, and comparable to that described in U.S. patent application Ser. No. 830,002, filed Sept. 1, 1977, and referenced above. This degraded mode sensor 42 will limit access at this remote terminal in accordance with data stored in the memory 69 in the main processing unit 11 until such time as the communication lines are degraded. At that time, the memory 49 and its memory control 63 will be utilized for limiting access. It can be seen, therefore, that the terminal 13 of the present invention can be used either as a stand-alone terminal by bypassing the degraded mode sensor 42, or may be used as a remote terminal with a central processor system 11, utilizing the degraded mode sensor 42 to impose stand-alone operation only if data lines are degraded.

The present invention permits the same data to be stored in the memory 69 and the memory 49 so that, even during degraded mode oepration, although use of the printer 75 may be lost (so that personnel flow data is no longer available), nevertheless the same limited number of personnel may be granted access at this remote location, so that security is not degraded.

Figure 5:
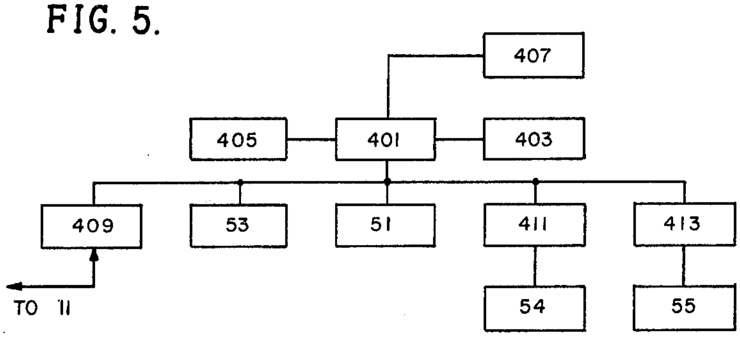
FIG. 5 is a schematic block diagram illustration of a programmable microprocessor system utilizing a program as included in this application for accomplishing the same basic functions provided by the hardwired embodiment of FIGS. 1–4.

The preceding embodiment described in reference to FIGS. 1 through 4 is illustrative of a hardwired circuit for performing the functions of the present invention. In the preferred embodiment, the functions of the remote units 13 are performed by a microprocessor, as illustrated in FIG. 5. This microprocessor includes a central processing unit 401, such as a Motorola 6800, which is connected with a memory unit 403, such as an AMI Model SF101. In addition, a scratch pad memory 405 can be provided, such as a Motorola 6810. The central processing unit 401 is also connected to a read only memory 407 in a typical fashion to store the control steps for the central processing unit.

As is typical, the central processing unit 401 interfaces with a communication interface unit, such as a Motorola 6850, 409, for communicating with the central processor 11, and may interfere, in addition, with the card sensor 43 and real-time sensor 51, similar to those shown in FIG. 1. A peripheral interface adapter 411, such as a Motorola 6820, is used to connect the central processing unit 401 to the door access control 54, such a door strike. The keyboard 55 of FIG. 1 may also be connected to the central processing unit 401 through the main data and control bus 413.

It will be recognized by those skilled in the art that the data processing unit, shown in FIG. 5, is typical of many other similar data processing units. What makes this processing unit unique is a program stored in the read-only memory 407 for controlling the operation of the central processing unit 401. This program, written for the Motorola 6800, is as follows:

```
                ; STANDB — STAND ALONE READER VERSION B — 19 DEC 77
                ;*******************************************************
                ;**                                                 ***
                ;**                                                 ***
                ;**           ZERO PAGE DECLARATIONS                ***
                ;**                                                 ***
                ;**                                                 ***
                ;********************************************JSD*****
                ;********************************************GFH*****
                ;
                ;
                ;  THIS IS THE CONTROL SOFTWARE FOR THE RUSCO
                ;  STAND-ALONE READER, BASED ON THE 68φφ MICROPROCESSOR.
                ;
                ;
                   TITLE      "ZERO PAGE"
                ;
        φφφφ    HACK       =          φ
φφφφ               ZSECT
                ;
                ;  DELAY COUNTERS
                ;
                ;
                ;  THESE TWO BYTE COUNTERS ARE INCREMENTED
                ;  ON EVERY CLOCK TICK. WHEN ONE OF THEM
                ;  CLOCKS TO ZERO, THE ASSOCIATED COMPLETION
                ;  ROUTINE IS CALLED.
                ;
                ;  IF A COUNTER IS ZERO, IT STOPS
                ;  THIS TABLE RUNS PARALLEL TO 'SERV'
                ;>>>>THE ORDER OF THE ENTRIES IS CRITICAL!!!
                ;  E.G. ASCNTR MUST BE SIXTH BECAUSE OF THE CNTDN KLUDGE
                ;
        φφφφZ   CNTRS      =          *
φφφφ            OPCNTR:    BLOCK      2       ;(!) SET BY OPEN; WAKES GOON
φφφ2            GOCNTR:    BLOCK      2       ;(!) SET BY GOON; WAKES GOOFF
φφφ4            GXCNTR:    BLOCK      2       ;(!)SET BY GOON, GXOFF; WAKES
                           GXOFF
φφφ6            EDCNTR:    BLOCK      2       ;SET BY COMCON;WAKES EDEND
φφφ8            ERCNTR:    BLOCK      2
φφφA            ASCNTR:    BLOCK      2       ;(!)SET BY GOOFF; WAKES
                           RLYOFF(2φ)
φφφC            DUCNTR:    BLOCK      2
φφφE              BLOCK    2          ;FOR PATCHING
                ; NOTE:    (!) MEANS CLEARED BY NOTIME
                ;***
        φφ1φ    NCNTRS     =          *-CNTRS   ;NUMBER OF **BYTES** OF
                           COUNTERS
                ;
                ;  STATE FLAGS
                ;
                ;
                ;  SOME BYTES TO INDICATE THE CURRENT MACHINE
                ;  STATE AND THE RESULTS OF PROCESSING A CARD
```

-continued

```
                ; ENTRY.
                ;
ϕϕ1ϕ            APBFLG:   BLOCK  1
ϕϕ11            CRDFLG:   BLOCK  1
ϕϕ12            EDMODE:   BLOCK  1    ;SET MEANS WE ARE EDITING
ϕϕ13            OHFLG:    BLOCK  1    ;1 MEANS OPEN HOUSE
                ;
                ;
                ;
                ; KEYBOARD DATA TABLES
                ;
ϕϕ14            KEYTAB:   BLOCK  5    ;IDEK OR EDIT INPUT
ϕϕ19            KEYZON:   BLOCK  1    ;SIXTH EDIT DIGIT
ϕϕ1A            KEYPTR:   BLOCK  1    ;ALWAYS ZERO
ϕϕ1B            KEYCNT:   BLOCK  1
ϕϕ1C            DURESF:   BLOCK  1
ϕϕ1D            CMDBYT:   BLOCK  1    ;ZERO OR KEYBOARD CMD
ϕϕ1E            POISON:   BLOCK  1    ;WIPE OUT DISPLAY
                ;         ;ON NEXT NUMERIC KEY
ϕϕ1F            KEYFLG:   BLOCK  1    ;WEVE SEEN THIS KEY BEFORE
ϕϕ2ϕ            OLDKEY:   BLOCK  1    ;FF OR LAST KEY SEEN
                ;
ϕϕ21            MASTER:   BLOCK  4    ;CARD DIGIT INDICES
ϕϕ25            MASHER:   BLOCK  4    ;" " " BUT UNPERMUTED
ϕϕ29            MATCH:    BLOCK  1
                ;
                ; CARD DATA BUFFER
                ;
ϕϕ2A            DIGTAB:   BLOCK  8    ;DIGITS READ FROM CARD
ϕϕ32            ENDMEM:   BLOCK  2    ;FIRST ADDR NOT IN CMOS MEMORY
ϕϕ34            DISDIG:   BLOCK  3    ;SEARCH COMPARAND
ϕϕ37            EDTPTR:   BLOCK  2    ;FIRST BYTE OF 'THIS' RECORD
ϕϕ39            EDTZON:   BLOCK  1 ;TIME ZONE OF 'THIS' RECORD
                ; ZERO MEANS EDTPTR POINTS TO INVALID RECORD
                ;
                ; ERROR RETRIES ID AND COUNT
                ;
ϕϕ3A            RTLBUF:   BLOCK  5
ϕϕ3F            NTRIES:   BLOCK  1
                ;
                ; XREG
                ;
                ;
                ; SAVE AREAS FOR X BECAUSE YOU CAN'T
                ; SAVE IT ANY OTHER WAY
                ;
ϕϕ4ϕ            XREGϕ:    BLOCK  2
ϕϕ42            XREG1:    BLOCK  2
ϕϕ44            SCNPTR:   BLOCK  2
ϕϕ46            DIGPTR:   BLOCK  2
ϕϕ48            COMBX:    BLOCK  2
ϕϕ4A            MIXPTR:   BLOCK  2
ϕϕ4C            MUXPTR:   BLOCK  2    ;POINTS TO DIGIT TO BE
                          DISPLAYED
ϕϕ4E            MUXTMP:   BLOCK  1
                ;
                ;
                ; FPROM AND I/O ADDRESSES
                ;
                ;
                ;
          ϕϕ8ϕ  FPROM     =      $8ϕ
          ϕϕ84  SCNTAB    =      $84      ;COIL ADDR TABLE
                ;
          ϕϕA4  BUFA      =      $A4      ;PIA COIL ADDRESSES
          ϕϕA5  CSRA      =      BUFA+1
          ϕϕA6  BUFB      =      BUFA+2   ;PIA RELAYS
          ϕϕA7  CSRB      =      BUFA+3
                ;
          ϕϕA8  ACSTAT    =      $ϕϕA8    ;ACIA STATUS PORT
          ϕϕA9  ACDATA    =      ACSTAT+1     ;ACIA I/O PORT
                ;
          ϕϕEϕ  ROWϕ      =      $ϕϕEϕ        ;KEYBOARD SWITCH ROW
                ; DIP SWITCH ADDRESSES
ϕϕC3                 ASECT  $ϕϕC3
ϕϕC3            S.XXX:    BLOCK  1    ;EXTERNAL SENSOR SWITCHES
ϕϕC4            S.COMB:   BLOCK  1    ;PERMUTATION & COMBINATION
ϕϕC5            S.SYS:    BLOCK  1    ;SYSTEM CODE
          ϕϕC6  S.AS      =      *    ;AS/DOD TIMER COUNT
ϕϕC6            S.VTD:    BLOCK  1    ;VTD TIMER COUNT
                ;
                ; CMOS MEMORY ASSIGNMENTS
```

```
φφφφ              VSECT
φφφφ             SUM:       BLOCK     2          ;CHECKSUM OF REST OF CMOS
φφφ2             FOX:       BLOCK     3          ;ID OF PERSON ALLOWED TO
                            EDIT MEMORY
φφφ5             ENDPTR:    BLOCK     2          ;FIRST BYTE AFTER VALID
                            MEMORY
φφφ7             CMOS:      BLOCK     3*5        ;ALLOW FIVE ENTRIES
        φφ16V    END1       =         *          ;FIRST ADDR NOT IN CMOS
φφ16              BLOCK     3         ;AND ONE MORE
        φφ19V    END2       =         *
φφφφ              PSECT
                 ;
                 ; KLUDGEY LINKS TO FOREGROUND MODULE
                 ;
φφφφ             RTC:       BLOCK     3
φφφ3             OPEN:      BLOCK     3
φφφ6             BLANK:     BLOCK     3
φφφ9             RLYON:     BLOCK     3
                 ;
        φφφ6P    RUBOUT     =         BLANK
                 ;
                 ; RESET AND INTERRUPT VECTORS
                 ;
φFF8               ASECT    $φFF8
φFF8               WORD     RTC       ;REAL TIME CLOCK
φFFA               WORD     $FCφ4     ;SWI TO KERNEL
                 ;
                 ; BIT MASKS, ETC.
                 ;
                 ;************
                 ;
                 ; FIRST, THE OPTION BITS
                 ; THESE SYMBOLS ARE USED TO REFER TO BITS IN
                 ; THE OPTION BYTES
                 ;
                 ;** FIRST OPTION BYTE
        φφ4φ     O.OH       =         $4φ        ;OPEN HOUSE MODE
        φφ2φ     O.AS       =         $2φ        ;ALARM SHUNT
        φφφ8     O.BIG      =         $φ8        ;LARGE CMOS MEMORY
        φφφ2     O.TZ       =         $φ2        ;TIME ZONE INPUTS
        φφφ1     O.IDEK     =         $φ1        ;WE ARE AN IDEK READER
                 ;** NOW FOR THE SECOND BYTE OF OPTIONS
        φφ4φ     O.ERAN     =         $4φ        ;ERROR ANNUNCIATOR
        φφ2φ     O.DUR      =         $2φ        ;DURESS RELAY
                 ;
                 ; NOW FOR THE RELAY BITS
                 ;
        φφ8φ     R.GO       =         $8φ
        φφ4φ     R.DUR      =         $4φ        ;DURESS RELAY
        φφ2φ     R.AS       =         $2φ        ;ALARM SHUNT
        φφ1φ     R.ERRAN    =         $1φ        ;ERRAN
                 ;
                 ; NOW FOR THE EXTERNAL SWITCHES
                 ; (THESE ARE BITS WITHIN THE WORD S.XXX)
                 ;
        φφφ1     X.ICK      =         $φ1        ;CLOSED=ZERO=CARD ONLY
                 ;X.TRIES    =         $φ6        ;NTRIES SWITCH INPUTS
        φφφ8     X.FOX      =         $φ8        ;STORE NEXT CARD AS FOX
                 ;X.TZ       =         $7φ        ;TIME CLOCK INPUTS
        φφ8φ     X.AS       =         $8φ        ;SHUNT REQUEST PUSHBUTTON
                              SWITCH
                 ;
                 ;
                 ; DELAY TIMES
                 ;
                 ;
                 ; THE COUNTER/TIMERS IN THE FOREGROUND ROUTINE
                 ; ARE CLOCKED ONCE EVERY 3.33
                 ; MILLISECONDS (3φφ TIMES A SECOND).
                 ; EACH COUNTER IS A TWφ BYTE COUNTER, AND
                 ; IS INCREMENTED ON EACH CLOCK TICK.
                 ; TIMEOUT OCCURS WHEN COUNTER OVERFLOWS
                 ; TO ZERO.
                 ;
                 ;
        FFFφ     T.5φMS     =         -16        ;5φ MILLISECONDS
        FED4     T.φ1S      =         -3φφ       ;1 SECOND
        FC7C     T.φ3S      =         -9φφ       ;3 SECONDS
        F448     T.1φS      =         -3φφφ      ;1φ SECONDS
        DCD8     T.3φS      =         -9φφφ      ;3φ SECONDS
        B9Bφ     T.6φS      =         -18φφφ     ;ONE MIN
                 ;
```

-continued

```
                          ;
                          ; BACK
                          ;
                          ;
                          ; THIS IS THE CONTROLLING PROGRAM FOR THE
                          ; BACKGROUND TASKS. MOST OF THE EXECUTION
                          ; TIME OF THE PROCESSOR IS SPENT IN THIS
                          ; ROUTINE CHECKING STATUS BITS
                          ; AND WAITING TO BEGIN ONE OF SEVERAL
                          ; BACKGROUND TASKS. THE FOLLOWING
                          ; TASKS ARE INITIATED FROM THIS ROUTINE:
                          ;
                          ; 1. INITIATE RESPONSE TO CONSOLE INQUIRY
                          ; OR COMMAND.
                          ;
                          ; 2. CHECK FOR CARD, OPEN DOOR IF OK
                          ;
                          ; 3. CHECK FOR MASTER CARD, ACCEPT PROGRAMMING
                            COMMANDS
                          ;
                            TITLE    "BACK"
φφφC                        PSECT
                          ;
φφφC   8E   φφ68          START:   LDS      #$φφ68       ;INIT STACK PTR
φφφF   BD   φ197            JSR      IOSET        ;INITIALIZE I/O DEVICES
φφ12   BD   φ18C            JSR      CLRRAM       ;INITIALIZE MACHINE STATE
                          ;
φφ15   CE   FFFF            LDX      #$FFFF
φφ18   DF   8φ              STX      FPROM        ;ENABLE ALL FEATURES
                          ; DETERMINE MEMORY SIZE
φφ1A   CE   φφ16            LDX      #END1
φφ1D   96   8φ              LDAA     FPROM
φφ1F   84   φ8              ANDA     #O.BIG
φφ21   27   φ3 =            BEQ      ENDMMS
φφ23   CE   φφ19            LDX      #END2
φφ26   DF   32Z           ENDMMS:  STX      ENDMEM
                          ;
φφ28   BD   φ4φ1            JSR      CHKSUM       ;IS CMOS OK?
φφ2B   27   φ9 =            BEQ      SUMOK
φφ2D   7F   φφφ4            CLR      FOX+2        ;WIPE OUT PART OF FOX
φφ3φ   BD   φ3AE            JSR      DOCLR        ;WIPE OUT REST OF CMOS
φφ33   BD   φ412            JSR      SETSUM       ;SUM OK NOW!
            φφ36P         SUMOK    =            *
                          ;
φφ36                        PION                  ;TURN ON INTERRUPTS
                          ;
                          ;
                          ; MAIN BACKGROUND LOOP
                          ;
            φφ37P         BACK     =            *
φφ37   86   34              LDAA     #$34
φφ39   97   A5              STAA     CSRA         ;WAKE UP DEADMAN
φφ3B   96   11Z             LDAA     CRDFLG
φφ3D   81   φ1              CMPA     #$φ1         ;NEW CARD?
φφ3F   26   F6 =            BNE      BACK
                          ; HERE WHEN WE GET A NEW CARD
φφ41   BD   φ1B6            JSR      CARDRD
φφ44   BD   φ2B5            JSR      PAKARD       ;CONDENSE INTO DISDIG
                          ;
φφ47   BD   φ41C            JSR      CHKSYS
φφ4A   26   4C =            BNE      ERROR        ;BAD SYS CODE
φφ4C   BD   φ42D            JSR      FRTL         ;SEE IF NEW PERSON TRYING
                          ;
φφ4F   96   C3              LDAA     S.XXX
φφ51   84   φ8              ANDA     #X.FOX       ;NEW MASTER?
φφ53   27   4C =            BEQ      NEWFOX       ;YES . . . . DO NOT OPEN DOOR, THOUGH
                          ; SEE IF WE SHOULD GO INTO EDIT MODE
φφ55   BD   φ25φ            JSR      CHKFOX
φφ58   26   φ3 =            BNE      *+5
φφ5A   7E   φφF8            JMP      NEWED        ;YES, SIR!
                          ; HERE IF ORDINARY ENTRY ATTEMPT
φφ5D   86   34            BCK:     LDAA     #$34         ;KEEP DEADMAN FROM TRASHING US
φφ5F   97   A5              STAA     CSRA
φφ61   96   11Z             LDAA     CRDFLG       ;LEAVE LOOP IF CARD REMOVED PREMATURELY
φφ63   27   D2 =            BEQ      BACK
φφ65   BD   φφAD            JSR      CHKIDK       ;EXAMINE IDEK PASSWORD
φφ68   27   F3 =            BEQ      BCK          ;NOT READY YET
φφ6A   25   2C =            BCS      ERROR        ;HE FLUBBED HIS PASSWORD!
                          ;
φφ6C   96   13Z             LDAA     OHFLG
φφ6E   26   19 =            BNE      LETIN        ;TODAY IS OPEN HOUSE
                          ;
```

-continued

```
ϕϕ7ϕ  BD  ϕ2ϕ7     JSR     FIND              ;COMPARAND IN DISDIG ALREADY
                  ; HERE WITH APPROPRIATE TZ IN EDTZON
ϕϕ73  96  C3       LDAA    S.XXX    ;READ TIME ZONE INPUTS
ϕϕ75  44           LSRA
ϕϕ76  44           LSRA
ϕϕ77  44           LSRA
ϕϕ78  44           LSRA
ϕϕ79  84  ϕ7       ANDA    #$ϕ7     ;TZ INPUTS IN 3 LSBS
ϕϕ7B  8A  ϕ8       ORAA    #$ϕ8              ;SUPER TIME ZONE ALWAYS ON
                  ;
ϕϕ7D  D6  8ϕ       LDAB    FPROM
ϕϕ7F  C4  ϕ2       ANDB    #O.TZ    ;DID HE PAY FOR TIME ZONES?
ϕϕ87  27  ϕF =     BEQ     ERROR    ;NOT ALLOWED AT THIS TIME
                  ; HERE AFTER WE HAVE RUN THE ENTIRE GAUNTLET
                  ; ALL IS OK, LET HIM IN
ϕϕ89  86  FE      LETIN:   LDAA     #$FE     ;MEANS CARD PROCESSED
ϕϕ8B  97  11Z      STAA    CRDFLG
ϕϕ8D  BD  ϕ44A     JSR     DURESS
ϕϕ9ϕ  BD  ϕϕϕ3     JSR     OPEN
ϕϕ93  7F  ϕϕ3F     CLR     NTRIES
ϕϕ96  2ϕ  9F =     BRA     BACK     ;GO WAIT FOR NEXT CARD
                  ;
                  ;
                  ; HERE WHEN WE DECIDE THAT WE WILL NOT LET THIS GUY IN
          ϕϕ98P   ERROR    =        *
ϕϕ98  86  FE       LDAA    #$FE     ;WERE THROUGH WITH THIS CARD
ϕϕ9A  97  11Z      STAA    CRDFLG
ϕϕ9C  BD  ϕϕCE     JSR     ERRTRY   ;PULL IN ERRAN IF TOO MANY TRIES
ϕϕ9F  2ϕ  96 =     BRA     BACK
                  ;
                  ; HERE WHEN THE NEW FOX CARD IS PUT IN
          ϕϕA1P   NEWFOX   =        *
ϕϕA1  86  FE       LDAA    #$FE
ϕϕA3  97  11Z      STAA    CRDFLG   ;WE ARE THROUGH WITH THIS CARD
ϕϕA5  BD  ϕ23B     JSR     SETFOX
ϕϕA8  BD  ϕ412     JSR     SETSUM   ;FIX UP CHECKSUM
ϕϕAB  2ϕ  8A =     BRA     BACK
                  ;
                  ; ROUTINE TO CHECK IDEK PASSWORD
                  ; RETURNS WITH Z SET IF NOTT READY
                  ; RETURNS WITH C SET IF HE GOT IT WRONG
                  ; BOTH CLEAR IF ALL OK
          ϕϕADP   CHKIDK   =        *
ϕϕAD  96  8ϕ       LDAA    FPROM
ϕϕAF  84  ϕ1       ANDA    #O.IDEK
ϕϕB1  27  17 =     BEQ     HAPPY    ;NOT AN IDEK READER!
                  ;
ϕϕB3  96  C3       LDAA    S.XXX
ϕϕB5  84  ϕ1       ANDA    #X.ICK   ;CARD+ KEYBOARD?
ϕϕB7  27  11 =     BEQ     HAPPY    ;NO, CARD ONLY
                  ;
ϕϕB9  96  1BZ      LDAA    KEYCNT
ϕϕBB  81  ϕ4       CMPA    #$ϕ4     ;THERE ARE 4 DIGS IN A PASSWORD
ϕϕBD  2B  ϕ9 =     BMI     NOIDEK   ;NOT ENUF YET
                  ;
ϕϕBF  BD  ϕ45F     JSR     COMBIN
ϕϕC2  25  ϕ6 =     BCS     HAPPY
                  ; HERE IF BAD IDEK
ϕϕC4  86  ϕ1       LDAA    #1       ;NOT ZERO
ϕϕC6  ϕD           SEC
ϕϕC7  39           RTS
                  ; HERE IF NOT READY
          ϕϕC8P   NOIDEK   =        *
ϕϕC8  4F           CLRA
ϕϕC9  39           RTS
                  ; HERE IF GOOD IDEK
          ϕϕCAP   HAPPY    =        *
ϕϕCA  86  ϕ1       LDAA    #1
ϕϕCC  ϕC           CLC
ϕϕCD  39           RTS
                  ;
                  ;
                  ; CALL HERE ONCE FOR EACH ERROR
                  ; PULLS IN ERRAN WHEN NTRIES IS USED UP
ϕϕCEP             ERRTRY   =        *
ϕϕCE  96  81       LDAA    FPROM+1
ϕϕDϕ  84  4ϕ       ANDA    #O.ERAN
ϕϕD2  27  1A =     BEQ     ETD               ;SAVE OURSELVES A LOT OF WORK
                  ;
ϕϕD4  7C  ϕϕ3F     INC     NTRIES   ;KEEP COUNT
ϕϕD7  96  C3       LDAA    S.XXX    ;GET SWITCH SETTING
ϕϕD9  44           LSRA
```

```
ϕϕDA  84   ϕ3      ANDA   #$ϕ3
ϕϕDC  4C           INCA          ;ZERO ON SWITCHES=ONE TRY
ϕϕDD  91   3FZ     CMPA   NTRIES
ϕϕDF  26   ϕD =    BNE    ETD    ;STILL TRYING
                 ;
ϕϕE1  86   1ϕ      LDAA   #R.ERAN
ϕϕE3  BD   ϕϕϕ9    JSR    RLYON
ϕϕE6  7F   ϕϕ3F    CLR    NTRIES
ϕϕE9  CE   FC7C    LDX    #T.ϕ3S
ϕϕEC  DF   ϕ8Z     STX    ERCNTR
                 ;
ϕϕEE  39         ETD:     RTS
                 ;
                 ;
                 ; HERE WHEN THROUGH EDITING
           ϕϕEFP FINED    =      *
ϕϕEF  7F   ϕϕ12    CLR    EDMODE
ϕϕF2  BD   ϕϕϕ6    JSR    BLANK
ϕϕF5  7E   ϕϕ37    JMP    BACK
                 ;
                 ;
                 ; MAIN LOOP FOR EDITING MEMORY
                 ;
           ϕϕF8P NEWED    =      *
ϕϕF8  86   FE      LDAA   #$FE
ϕϕFA  97   11Z     STAA   CRDFLG ;HIS CARD IS FINISHED!
                 ;
ϕϕFC  7C   ϕϕ12    INC    EDMODE ;WE ARE NOW EDITING
ϕϕFF  BD   ϕ182    JSR    BADCMD
ϕ1ϕ2  CE   ϕϕϕ7    LDX    #CMCS
ϕ1ϕ5  DF   37Z     STX    EDTPTR
ϕ1ϕ7  CE   B9Bϕ    LDX    #T.6ϕS
ϕ1ϕA  DF   ϕ6Z     STX    EDCNTR ;TURN OFF IF IDLE ONE MIN
ϕ1ϕC  7F   ϕϕ39    CLR    EDTZON
                 ;
           ϕ1ϕFP EDIT     =      *
ϕ1ϕF  86   34      LDAA   #$34
ϕ111  97   A5      STAA   CSRA
ϕ113  7D   ϕϕ12    TST    EDMODE
ϕ116  27   D7 =    BEQ    FINED  ;LEAVE EDIT MODE
ϕ118  96   1DZ     LDAA   CMDBYT
ϕ11A  2F   F3 =    BLE    EDIT
ϕ11C  BD   ϕ129    JSR    COMCON
ϕ11F  BD   ϕ412    JSR    SETSUM
ϕ122  CE   B9Bϕ    LDX    #T.6ϕS
ϕ125  DF   ϕ6Z     STX    EDCNTR
ϕ127  2ϕ   E6 =    BRA    EDIT
                 ;
                 ; COMMAND DISPATCHER
                 ; CALL HERE WITH CMD CODE IN A
                 ;
           ϕ129P COMCON   =      *
ϕ129  7F   ϕϕ1D    CLR    CMDBYT ;SO WE WON'T TRY TO DO IT AGAIN
ϕ12C  84   ϕF      ANDA   #$ϕF   ;STRIP OFF HIGH ORDER BITS
ϕ12E  81   ϕB      CMPA   #$ϕB   ;BIGGEST CMD IS ϕA
ϕ13ϕ  2A   3B =    BPL    COMRTS ;ILLEGAL IGNORE
ϕ132  48           ASLA          ;TWO BYTES TO AN ADDR
                 ; AT THIS POINT A CONTAINS ϕϕϕϕXXXϕ
ϕ133  97   43Z     STAA   XREG1+1 ;LSB OFFSET
ϕ135  86   ??      LDAA   #MSB COMTAB
ϕ137  97   42Z     STAA   XREG1  ;MSB TABLE ADDR
ϕ139  DE   42Z     LDX    XREG1
ϕ13B  EE   ??      LDX    CMTLSB,X        ;LSB TABLE ADDR
ϕ13D  6E   ϕϕ      JMP    ϕ,X
                 ;
           ϕ13FP COMTAB   =      *
ϕ13F               WORD   RUBOUT,UP,C.OH,CLRALL
ϕ147               WORD   DOWN,C.XOH,DELETE,SEARCH
ϕ14F               WORD   RUBOUT,QUIT,INSERT.,RUBOUT
           ????  CMTLSB   =      LSB COMTAB
                 ;
                 ; SERVICE ROUTINE FOR QUIT CMD
ϕ157  7F   ϕϕ12  QUIT:    CLR    EDMODE ;BACKGRUND WILL NOTICE FLAG
ϕ15A  39           RTS
                 ;
                 ; SERVICE FOR OPEN HOUSE CMD
           ϕ15BP C.OH     =      *
ϕ15B  96   8ϕ      LDAA   FPROM
ϕ15D  84   4ϕ      ANDA   #O.OH
ϕ15F  27   21 =    BEQ    BADCMD
                 ;
ϕ161  BD   ϕϕϕ6    JSR    BLANK
```

-continued

```
φ164   86   φ1      LDAA    #$φ1
φ166   97   13Z     STAA    OHFLG
φ168   97   19Z     STAA    KEYZON    ;SHOW CMD ACCEPTED
φ16A   7C   φφ1E    INC     POISON
φ16D   39          COMRTS:  RTS
                   ;
                   ; SERVICE FOR END OPEN HOUSE CMD
          φ16EP    C.XOH    =         *
φ16E   96   8φ      LDAA    FPROM
φ17φ   84   4φ      ANDA    #O.OH
φ172   27   φE =    BEQ     BADCMD
                   ;
φ174   BD   φφφ6    JSR     BLANK
φ177   86   φ2      LDAA    #$φ2
φ179   97   19Z     STAA    KEYZON
φ17B   7C   φφ1E    INC     POISON
φ17E   7F   φφ13    CLR     OHFLG
                   ; HERE TO RETRUN A CODE OF ZERO
φ182   BD   φφφ6   BADCMD:  JSR       BLANK
φ185   7C   φφ1E    INC     POISON
φ188   7F   φφ19    CLR     KEYZON
φ18B   39           RTS
                   ;
                   ;
                   ;
                   ;   CLRRAM
                   ;
                   ;
                   ;   CLEARS ALL RAM FROM φφφφ TO VAREND
                   ;   USED TO INIT RAM ON STARTUP
                   ;
φ18C   CE   φφ4F   CLRRAM:  LDX       #VAREND
φ18F   6F   φφ     CLRRML:  CLR       φ,X
φ191   φ9           DEX
φ192   26   FB =    BNE     CLRRML
φ194   6F   φφ      CLR     φ,X       ;CLEAR BYTE ZERO ALSO!
φ196   39           RTS
                   ;
                   ;
                   ;
                   ; I/O INITIALIZATION ROUTINES
                   ;
                   ;
φ197   7F   φφA5   IOSET:   CLR       CSRA      ;ROUTING BIT=φ MEANS DDRS
φ19A   7F   φφA7    CLR     CSRB
φ19D   86   FF      LDAA    #$FF      ;1 MEANS OUTPUT
φ19F   97   A4      STAA    BUFA
φ1A1   86   FE      LDAA    #$FE                ;ONE INPUT FOR CARDIN
φ1A3   97   A6      STAA    BUFB
                   ; SET CA2 TO 'MANUAL', LOW=PG, HIGH=FG
                   ;   (FOR DEADMAN)
                   ; SET CA1 TO REACT TO FALLING EDGE OF COIL DATA
φ1A5   86   34      LDAA    #$34                ;$30 FOR FOREGROUND
φ1A7   97   A5      STAA    CSRA
                   ; CB2 REACTS TO THE RISING EDGE OF RTC
                   ; CB1 IS UNUSED
φ1A9   86   φE      LDAA    #$φE
φ1AB   97   A7      STAA    CSRB
                   ; NOW SET INITAL VALUES
                   ; NO COILS SELECTED, NO RELAYS ON
φ1AD   86   Fφ      LDAA    #$Fφ
φ1AF   97   A4      STAA    BUFA
φ1B1   86   φE      LDAA    #$φE
φ1B3   97   A6      STAA    BUFB
φ1B5   39          RTS2:    RTS
                   ;
                   ;
                   ;*************************************************
                   ;
                   ;            CARD READER
                   ;
                   ;*************************************************
                   ;
                   ;
                   ;   THIS SET OF ROUTINES READS THE MAGNETS,
                   ; ASSEMBLES BITS INTO 4-BIT DIGITS
                   ; AND STORES THEM ONE TO A WORD AT DIGTAB
                   ;
                   ;
φ1B6   CE   φφ84   CARDRD:  LDX       #SCNTAB   ;POINTS AT COIL ADDRESSES
φ1B9   DF   44Z     STX     SCNPTR
φ1BB   CE   φφ2A    LDX     #DIGTAB
```

-continued

```
φ1BE   DF   46Z     STX    DIGPTR   ;POINTS TO PLACE TO KEEP THE DIGITS
          φ1CφP   CRDRDL   =        *
                  ;
                  ; HERE TO READ THE NEXT DIGIT OF THE CARD
                  ;
                  ;   LDX    DIGPTR
                  ;          ;ASSUME X CONTAINS DIGPTR
φ1Cφ   8C   φφ31    CPX    #DIGTAB+7         ;STOP AFTER 7 DIGITS
φ1C3   26   φ1 =    BNE    CRDOIT
φ1C5   39           RTS             ;ALL DIGITS ACCUMULATED
                  ;
φ1C6   C6   1φ    CRDOIT:  LDAB     #$1φ          ;WILL CARRY AFTER
                  4 ITERATIONS
          φ1C8P   BITRDL   =        *
                  ; HERE TO READ ONE BIT AND INCLUDE IT IN DIGIT
                  ;
φ1C8   BD   φ1DA    JSR    CRDSCN   ;SCAN CARD FOR BIT
φ1CB   59           ROLB            ;ROLL CARRY BIT INTO B
φ1CC   7C   φφ45    INC    SCNPTR+1          ;UPDATE BIT INDEX LSB
φ1CF   24   F7 =    BCC    BITRDL   ;IF KLUDGEY FLAG BIT CARRIED OUT
                  ; WE HAVE A DIGIT
                  ; STORE IT IN RAM
                  ;
φ1D1   DE   46Z     LDX    DIGPTR
φ1D3   E7   φφ      STAB   φ,X
φ1D5   φ8           INX             ;UPDATE STORAGE POINTER
φ1D6   DF   46Z     STX    DIGPTR   ;SAFEKEEPING IN RAM
φ1D8   2φ   E6 =    BRA    CRDRDL   ;GO GET ANOTHER DIGIT
                  ;
                  ;
                  ;
                  ;
                  ; CRDSCN:   CHECKS MAGNET BIT
                  ;
                  ; CALL WITH INDEX INTO COIL ADDR TABLE IN SCNPTR
                  ; SETS CARRY BIT ACCORDING TO RESULT
                  ;
φ1DA   86   Fφ    CRDSCN:  LDAA     #$Fφ          ;CLEAR COILS
φ1DC   97   A4      STAA   BUFA
φ1DE   φ1           NOP             ;WAIT FOR COILS TO SETTLE
φ1DF   φ1           NOP
φ1Eφ   φ1           NOP
φ1E1   96   A4      LDAA   BUFA              ;CLR PIA EDGE DETECTOR
φ1E3   DE   44Z     LDX    SCNPTR   ;PTR FOR THIS BIT
                  ;
φ1E5   φ7           TPA             ;DISABLE INTERRUPTS DUE
φ1E6   36           PSHA            ;TO CRITICAL TIMING
φ1E7                PIOFF
                  ;
φ1E8   A6   φφ      LDAA   φ,X               ;GET COIL ADDRESS FROM FPROM
φ1EA   97   A4      STAA   BUFA              ;AND TURN ON COIL
φ1EC   φ1           NOP
φ1ED   φ1           NOP
φ1EE   φ1           NOP
φ1EF   φ1           NOP
φ1Fφ   φ1           NOP             ;WAIT FOR COIL RESPONSE
φ1F1   φ1           NOP
φ1F2   φ1           NOP             ;SET CARRY BIT ACCORDING TO
φ1F3   96   A5      LDAA   CSRA              ;RESPONSE ON CRA7
φ1F5   2B   φ8 =    BMI    CRDSC
                  ;
φ1F7   32           PULA            ;RESTORE INTERRUPT STATUS
φ1F8   φ6           TAP
φ1F9   86   Fφ      LDAA   #$Fφ     ;TURN OFF COIL
φ1FB   97   A4      STAA   BUFA
φ1FD   φD           SEC             ;NORTH SPOT—SET CARRY
φ1FE   39           RTS
                  ;
φ1FF   32         CRDSC:   PULA              ;RESTORE INTERUPT STATUS
φ2φφ   φ6           TAP
φ2φ1   86   Fφ      LDAA   #$Fφ
φ2φ3   97   A4      STAA   BUFA
φ2φ5   φC           CLC             ;SOUTH SPOT—CLR CARRY
                  ;
φ2φ6   39         RTS
                  ;
                  ;   FIND
                  ;
                  ;   THE FIND ROUTINE SEARCHES THE TABLE OF IDS FOR THE ID
                  ;   STORED IN DISDIG. IF THE ID IS FOUND IN THE TABLE THEN
                  ;   THE TIME ZONE FOR THAT ID IS RETURNED IN
                  ;   EDTZON. ALSO, THE VARIABLE EDTPTR IS SET TO
```

-continued

```
                        ;    POINT TO THE FIRST BYTE OF THE MATCHING ENTRY.
                        ;    IF THE ID IS NOT FOUND THEN EDTZON IS SET TO
                        ;    ZERO AND EDTPTR POINTS TO THE FIRST ENTRY LARGER
                        ;    THAN THE ID. IF THE ID IS GREATER THAN ALL THE ENTRIES
                        ;    IN THE TABLE THEN EDTPTR HAS THE VALUE ENDPTR.
                        ;
φ2φ7   CE   φφφ4        FIND:     LDX      #CMOS-3  ;ADDRESS OF TABLE - 3
                        ;
φ2φA   BD   φ3DE        DOENT:    JSR      INX3          ;NEXT ELEMENT OF TABLE
φ2φD   DF   37Z            STX    EDTPTR            ;MAYBE THIS IS THE ENTRY WE
                                    SEEK
φ2φF   BC   φφφ5           CPX    ENDPTR            ;END OF TABLE
φ212   27   φD =           BEQ    NOTFOU            ;WELL COMPARAND NOT FOUND IN
                                  TABLE
                        ;
φ214   BD   φ225           JSR    COMDIG   ;COMPARE DISDIG AND TABLE ENTRY
φ217   25   F1 =           BCS    DOENT    ;IF LOW THEN TRY NEXT ENTRY
φ219   22   φ6 =           BHI    NOTFOU   ;WE HAVE GONE TOO FAR
                        ;
φ21B   A6   φ2             LDAA   2,X               ;GET THIRD BYTE OF ENTRY
φ21D   84   φF             ANDA   #$φF              ;LEAVE ONLY TIME ZONE
φ21F   2φ   φ1 =           BRA    RET
                        ;
φ221   4F               NOTFOU:   CLRA              ;ZERO TIME ZONE
                        ;
φ222   97   39Z         RET:      STAA     EDTZON   ;SAVE TIME ZONE
φ224   39                  RTS
                        ;
                        ;    COMDIG
                        ;
                        ;    COMDIG COMPARES THE ENTRY POINTED TO BY X
                        ;    WITH THE ID STORED IN DISDIG. RETURNS CARRY SET
                        ;    IF THE ENTRY IS SMALLER, ZERO SET IF THEY ARE
                        ;    THE SAME.
                        ;
φ225   A6   φφ          COMDIG:   LDAA     φ,X           ;GET FIRST BYTE OF
                              TABLE ENTRY
φ227   91   34Z            CMPA   DISDIG   ;COMPARE TABLE BYTE AND ID BYTE
φ229   26   φF =           BNE    RETCOM   ;RETURN IF NOT EQUAL
                        ;
φ22B   A6   φ1             LDAA   1,X      ;SECOND BYTE OF TABLE ENTRY
φ22D   91   35Z            CMPA   DISDIG+1          ;COMPARE SECOND BYTES
φ22F   26   φ9 =           BNE    RETCOM
                        ;
φ231   A6   φ2             LDAA   2,X      ;THIRD BYTE
φ233   84   Fφ             ANDA   #$Fφ     ;ZAP TIME ZONE FIELD
φ235   D6   36Z            LDAB   DISDIG+2   ;GET THIRD BYTE OF DISDIG
φ237   C4   Fφ             ANDB   #$Fφ     ;ZAP ITS TIME ZONE, TOO
φ239   11                  CBA
                        ;
φ23A   39               RETCOM:   RTS
                        ;
                        ;    SETFOX
                        ;
                        ;    SETFOX SETS THE MASTER CARD. THE KEY IN DIGTAB
                        ;    IS STORED INTO THE LOCATION FOX.
                        ;
φ23B   BD   φ2B5        SETFOX:   JSR      PAKARD   ;PACK DIGTAB INTO DISDIG
φ23E   96   34Z            LDAA   DISDIG   ;GET FIRST BYTE OF DISDIG
φ24φ   B7   φφφ2           STAA   FOX      ;PUT INTO FIRST BYTE OF FOX
φ243   96   35Z            LDAA   DISDIG+1          ;SECOND DIGIT
φ245   B7   φφφ3           STAA   FOX+1
φ248   96   36Z            LDAA   DISDIG+2
φ24A   8A   φF             ORAA   #$φF     ;PUT IN 'F' TIME ZONE
φ24C   B7   φφφ4           STAA   FOX+2
φ24F   39                  RTS
                        ;
                        ;
                        ;    CHKFOX
                        ;
                        ;    CHKFOX CHECKS FOR THE MASTER CARD TO ALLOW
                        ;    EDITING OF THE TABLE OF IDS. RETURNS THE
                        ;    ZERO FLAG TRUE IF THE ID IN DIGTAB IS THE MASTER
                        ;    CARD, OTHERWIZE ZERO IS SET TO FALSE.
                        ;
φ25φ   BD   φ2B5        CHKFOX:   JSR      PAKARD   ;PACK DIGITS INTO DISDIG
φ253   CE   φφφ2           LDX    #FOX
φ256   BD   φ225           JSR    COMDIG   ;CHECK IF DIGITS ARE THE SAME
φ259   26   φ7 =           BNE    CHFRET   ;IF NOT RETURN
φ25B   B6   φφφ4           LDAA   FOX+2    ;GET THIRD DIGIT OF MASTER
φ25E   84   φF             ANDA   #$φF     ;LEAVE ONLY TIME ZONE
φ26φ   81   φF             CMPA   #$φF     ;IS TIME ZONE 'F'
```

-continued

```
φ262   39          CHFRET:    RTS
                   ;
                   ;  SEARCH
                   ;
                   ;  SEARCH SEARCHES FOR THE ID IN
                   ;  KEYTAB. IF THE ENTRY EXISTS THEN THE TIME ZONE
                   ;  IS PUT IN THE DISPLAY, OTHERWISE ZERO IS PUT IN THE
                   ;  TIME ZONE DISPLAY. EDTPTR POINTS TO THE ENTRY IF IT
                   ;  IS FOUND OTHERWISE IT POINTS TO THE FIRST LARGER ENTRY
                   ;  OR ENDPTR IF THERE IS NO LARGER ENTRY.
                   ;
φ263   7F   φφ19   SEARCH:    CLR     KEYZON    ;PREPARE FOR PACKING
φ266   BD   φ271      JSR     PKDIG     ;PACK KEYTAB INTO DISDIG
φ269   BD   φ2φ7      JSR     FIND      ;FIND THE ENTRY
φ26C   96   39Z       LDAA    EDTZON    ;GET THE TIME ZONE(ZERO IF INVALID)
φ26E   97   19Z       STAA    KEYZON    ;DISPLAY TIME ZONE
φ27φ   39             RTS
                   ;
                   ;  PKDIG
                   ;
                   ;  PKDIG PACKS THE DIGITS IN
                   ;  KEYTAB INTO DISDIG TWO DIGITS TO A BYTE.
                   ;
φ271   96   14Z    PKDIG:     LDAA    KEYTAB    ;GET FIRST BYTE OF KEYTAB
φ273   BD   φ3E6      JSR     ASLA4     ;SHIFT DIGIT INTO LEFT HALF OF BYTE
φ276   9A   15Z       ORAA    KEYTAB+1    ;OR SECOND DIGIT INTO RIGHT HALF
φ278   97   34Z       STAA    DISDIG    ;STORE IT AS FIRST BYTE OF DISDIG
φ27A   96   16Z       LDAA    KEYTAB+2    ;THIRD DIGIT
φ27C   BD   φ3E6      JSR     ASLA4
φ27F   9A   17Z       ORAA    KEYTAB+3    ;FOURTH DIGIT
φ281   97   35Z       STAA    DISDIG+1    ;SECOND BYTE OF DISDIG
φ283   96   18Z       LDAA    KEYTAB+4    ;FIFTH DIGIT
φ285   BD   φ3E6      JSR     ASLA4
φ288   9A   19Z       ORAA    KEYZON    ;TIME ZONE
φ28A   97   36Z       STAA    DISDIG+2
φ28C   39             RTS
                   ;
                   ;  UPKDIG
                   ;
                   ;  UPKDIG UNPACKS THE DIGITS IN DISDIG INTO KEYTAB
                   ;  FOR DISPLAY.
                   ;
φ28D   96   34Z    UPKDIG:    LDAA    DISDIG    ;GET BYTE ONE OF DISDIG
φ28F   BD   φ3EB      JSR     LSRA4     ;GET LEFT DIGIT INTO RIGHT HALF
φ292   97   14Z       STAA    KEYTAB    ;FIRST BYTE OF KEYTAB
φ294   96   34Z       LDAA    DISDIG    ;GET BYTE ONE AGAIN
φ296   84   φF        ANDA    #$φF      ;MASK LEFT DIGIT
φ298   97   15Z       STAA    KEYTAB+1    ;SECOND BYTE OF KEYTAB
φ29A   96   35Z       LDAA    DISDG+1     ;BYTE TWO OF DISDIG
φ29C   BD   φ3FB      JSR     LSRA4
φ29F   97   16Z       STAA    KEYTAB+2
φ2A1   96   35Z       LDAA    DISDIG+1
φ2A3   84   φF        ANDA    #$φF
φ2A5   97   17Z       STAA    KEYTAB+3
φ2A7   96   36Z       LDAA    DISDIG+2
φ2A9   BD   φ3EB      JSR     LSRA4
φ2AC   97   18Z       STAA    KEYTAB+4
φ2AE   96   36Z       LDAA    DISDIG+2
φ2Bφ   84   φF        ANDA    #$φF
φ2B2   97   19Z       STAA    KEYZON    ;TIME ZONE
φ2B4   39             RTS
                   ;
                   ;  PAKARD
                   ;
                   ;  PAKARD PACKS THE DIGITS IN DIGTAB INTO DISDIG
                   ;
φ2B5   96   2AZ    PAKARD:    LDAA    DIGTAB
φ2B7   BD   φ3E6      JSR     ASLA4
φ2BA   9A   2BZ       ORAA    DIGTAB+1
φ2BC   97   34Z       STAA    DISDIG
φ2BE   96   2CZ       LDAA    DIGTAB+2
φ2Cφ   BD   φ3E6      JSR     ASLA4
φ2C3   9A   2DZ       ORAA    DIGTAB+3
φ2C5   97   35Z       STAA    DISDIG+1
φ2C7   96   2EZ       LDAA    DIGTAB+4
φ2C9   BD   φ3E6      JSR     ASLA4
φ2CC   97   36Z       STAA    DISDIG+2
φ2CE   39             RTS
                   ;
                   ;  DELETE
                   ;
                   ;  DELETE REMOVES THE ENTRY POINTED TO BY EDTPTR FROM THE
```

-continued

```
                     ;    TABLE OF VALID IDS. ZAP TIME ZONE IN DISPLAY
                     ;    ASSUME: #CMOS <= EDTPTR < ENDPTR
                     ;
φ2CF  7D   φφ39      DELETE:   TST      EDTZON   ;IS THIS ENTRY VALID
φ2D2  27   24 =         BEQ    NOENT
φ2D4  DE   37Z          LDX    EDTPTR            ;GET 'THIS' ENTRY
                     ;
φ2D6  BC   φφφ5      DELTOP:   CPX      ENDPTR   ;ARE WE PAST LAST ENTRY
φ2D9  27   11 =         BEQ    OUT               ;DONE
φ2DB  A6   φ3           LDAA   3,X               ;MOVE NEXT ENTRY ONTO THIS
                               ENTRY
φ2DD  A7   φφ           STAA   φ,X
φ2DF  A6   φ4           LDAA   4,X
φ2E1  A7   φ1           STAA   1,X
φ2E3  A6   φ5           LDAA   5,X
φ2E5  A7   φ2           STAA   2,X
φ2E7  BD   φ3DE         JSR    INX3              ;ADD 3 TO X
φ2EA  2φ   EA =         BRA    DELTOP            ;MOVE NEXT ENTRY
                     ;
φ2EC  BD   φ3E2      OUT:      JSR      DEX3        ;DECREMENT X BY 3
φ2EF  FF   φφφ5         STX    ENDPTR   ;ENDPTR = ENDPTR - 3
φ2F2  7F   φφ39         CLR    EDTZON   ;CURRENT ENTRY IS NOT VALID
φ2F5  7F   φφ19         CLR    KEYZON   ;ZAP TIME ZONE IN DISPLAY
φ2F8  39             NOENT:  RTS
                     ;
                     ;    INSERT
                     ;
                     ;    INSERT INSERTS THE ID AND TIME ZONE IN KEYTAB
                     ;    INTO THE TABLE.
                     ;
                     INSERT.:
φ2F9  CE   φφφ5         LDX    #5       ;5 ITERATIONS
                     ;
φ2FC  A6   13Z       INSNXT:   LDAA     KEYTAB-1,X   ;GET DIGIT OF KEYTAB
φ2FE  81   φ9           CMPA   #$φ9              ;CHK FOR GREATER THAN 9
φ3φφ  22   62 =         BHI    INSFAI   ;ILLEGAL DIGIT GO AWAY
φ3φ2  φ9                DEX
φ3φ3  26   F7 =         BNE    INSNXT
                     ;
φ3φ5  96   19Z          LDAA   KEYZON   ;GET TIME ZONE
φ3φ7  81   φ8           CMPA   #$φ8              ;ILLEGAL?
φ3φ9  22   59 =         BHI    INSFAI   ;GO AWAY
φ3φB  7D   φφ19         TST    KEYZON   ;ILLEGAL TIME ZONE
φ3φE  27   54 =         BEQ    INSFAI   ;IF SO GO AWAY
                     ;
φ31φ  BD   φ271         JSR    PKDIG    ;PACK KEYTAB INTO DISDIG
φ313  BD   φ2φ7         JSR    FIND     ;SEE IF ENTRY IN TABLE
φ316  7D   φφ39         TST    EDTZON   ;CHECK ZONE
φ319  26   25 =         BNE    HAVSPA   ;ITS ALREADY THERE
φ31B  FE   φφφ5         LDX    ENDPTR   ;GET POINTER TO PAST LAST ENTRY
φ31E  9C   32Z          CPX    ENDMEM   ;ARE WE PAST END OF MEMORY
φ32φ  27   38 =         BEQ    OVERFL
                     ;
φ322  9C   37Z       INSTOP:   CPX      EDTPTR   ;ARE WE UP TO CURRENT ENTRY
φ324  27   11 =         BEQ    OUT1
φ326  BD   φ3E2         JSR    DEX3     ;DECREMENT X BY 3
φ329  A6   φφ           LDAA   φ,X      ;MOVE THIS ENTRY DOWN BY ONE
φ32B  A7   φ3           STAA   3,X
φ32D  A6   φ1           LDAA   1,X
φ32F  A7   φ4           STAA   4,X
φ331  A6   φ2           LDAA   2,X
φ333  A7   φ5           STAA   5,X
φ335  2φ   EB =         BRA    INSTOP   ;MOVE NEXT ENTRY
                     ;
φ337  FE   φφφ5      OUT1:     LDX      ENDPTR   ;INCREMENT ENDPTR BY 3
φ33A  BD   φ3DE         JSR    INX3
φ33D  FF   φφφ5         STX    ENDPTR
φ34φ  BD   φ3BA      HAVSPA:   JSR      EDTIN    ;READ KEYTAB INTO TABLE
φ343  96   19Z          LDAA   KEYZON   ;GET TIME ZONE FROM DISPLAY
φ345  97   39Z          STAA   EDTZON   ;PUT IT IN EDTZON
                     ; HERE TO FLASH THE DISPLAY OFF
φ351  φ9                DEX
φ352  26   F9 =         BNE    FLASH
φ354  7C   φφ1E         INC    POISON
φ357  7E   φ3CC         JMP    EDTOUT   ;RESTORE DISPLAY AND RETURN
                     ;
φ35A  BD   φφφ6      OVERFL:   JSR      BLANK    ;BLANK DISPLAY
φ35D  7F   φφ19         CLR    KEYZON   ;ZERO THE DISPLAY TIME ZONE
φ36φ  7C   φφ1E         INC    POISON
φ363  39                RTS
                     ;
φ364  7F   φφ39      INSFAI:   CLR      EDTZON   ;ILLEGAL ENTRY
```

-continued

```
φ367   7F   φφ19      CLR     KEYZON    ;ZAP TIME ZONE IN DISPLAY
φ36A   39             RTS
                    ;
                    ;    UP
                    ;
                    ;    UP MOVES EDTPTR UP TO THE PREVIOUS ENTRY.
                    ;    IF THE POINTER IS ALREADY AT THE FIRST ENTRY
                    ;    OF THE TABLE IT IS NOT MOVED.
                    ;
φ36B   DE   37Z     UP:       LDX       EDTPTR   ;GET CURRENT ENTRY
φ36D   8C   φφφ7      CPX     #CMOS     ;ARE WE AT THE FIRST ENTRY
φ37φ   27   φC =      BEQ     RETUP     ;IF SO THE RETURN
φ372   BD   φ3E2      JSR     DEX3      ;ELSE DECREMENT X BY 3
φ375   DF   37Z       STX     EDTPTR    ;EDTPTR = EDTPTR - 6
φ377   BD   φ3CC      JSR     EDTOUT    ;PUT ENTRY INTO DISPLAY
φ37A   96   19Z       LDAA    KEYZON    ;GET TIME ZONE
φ37C   97   39Z       STAA    EDTZON    ;LEAVE IN EDTZON
φ37E   39           RETUP:    RTS
                    ;
                    ;
                    ;    DOWN
                    ;
                    ;    DOWN MOVES EDTPTR DOWN BY ONE ENTRY. IF EDTPTR IS
                    ;    ALREADY THE LAST ELEMENT OF THE TABLE DO NOTHING.
                    ;
φ37F   DE   37Z     DOWN:     LDX       EDTPTR   ;GET EDIT POINTER
φ381   BC   φφφ5      CPX     ENDPTR    ;PAST LAST ENTRY?
φ384   27   16 =      BEQ     RETDWN    ;GO AWAY
φ386   7D   φφ39      TST     EDTZON    ;IS CURRENT ENTRY LEGAL
φ389   27   φ3 =      BEQ     ZERZON    ;USE THIS ENTRY
φ38B   BD   φ3DE      JSR     INX3      ;GO TO NEXT ENTRY
φ38E   BC   φφφ5    ZERZON:   CPX       ENDPTR   ;PAST LAST ENTRY NOW?
φ391   27   φ9 =      BEQ     RETDWN    ;GO AWAY
φ393   DF   37Z       STX     EDTPTR    ;SAVE AS EDTPTR
φ395   BD   φ3CC      JSR     EDTOUT    ;PUT OUT ENTRY ON DISPLAY
φ398   96   19Z       LDAA    KEYZON    ;GET TIME ZONE OF DISPLAY
φ39A   97   39Z       STAA    EDTZON    ;PUT IT IN EDIT ZONE
φ39C   39           RETDWN:   RTS
                    ;
                    ;    CLRALL
                    ;
                    ;    CLRALL CLEARS THE ENTIRE TABLE OF VALID IDS
                    ;
φ39D   96   14Z     CLRALL:   LDAA      KEYTAB   ;GET FIRST BYTE OF DISPLAY
φ39F   9A   15Z       ORAA    KEYTAB+1           ;OR IN SECOND BYTE
φ3A1   9A   16Z       ORAA    KEYTAB+2
φ3A3   9A   17Z       ORAA    KEYTAB+3
φ3A5   9A   18Z       ORAA    KEYTAB+4
φ3A7   9A   19Z       ORAA    KEYZON
φ3A9   26   φE =      BNE     CLRRET    ;IF DISPLAY NOT ALL ZERO GO AWAY
φ3AB   BD   φφφ6      JSR     BLANK     ;BLANK DISPLAY
                    ;
φ3AE   CE   φφφ7    DOCLR:    LDX       #CMOS    ;GET START OF TABLE
φ3B1   FF   φφφ5      STX     ENDPTR    ;MAKE IT END OF TABLE
φ3B4   DF   37Z       STX     EDTPTR    ;ALSO CURRENT ENTRY
φ3B6   7F   φφ39      CLR     EDTZON    ;THIS ENTRY ILLEGAL
φ3B9   39           CLRRET:   RTS
                    ;
                    ;    EDTIN
                    ;
                    ;    EDTIN READS THE DISPLAY IN KEYTAB INTO THE ENTRY
                    ;    POINTED TO BY EDTPTR.
                    ;
φ3BA   BD   φ271    EDTIN:    JSR       PKDIG    ;PACK THE DIGITS INTO DISDIG
φ3BD   DE   37Z       LDX     EDTPTR    ;GET POINTER TO ENTRY
φ3BF   96   34Z       LDAA    DISDIG    ;GRAB FIRST BYTE OF DISDIG
φ3C1   A7   φφ        STAA    φ,X       ;PUT IT INTO TABLE
φ3C3   96   35Z       LDAA    DISDIG+1
φ3C5   A7   φ1        STAA    1,X
φ3C7   96   36Z       LDAA    DISDIG+2
φ3C9   A7   φ2        STAA    2,X
φ3CB   39             RTS
                    ;
                    ;
                    ;    EDTOUT
                    ;
                    ;    EDTOUT PUTS THE ENTRY POINTED TO BY EDTPTR
                    ;    OUT ONTO THE DISPLAY.
                    ;
φ3CC   DE   37Z     EDTOUT:   LDX       EDTPTR   ;GET POINTER TO ENTRY
φ3CE   A6   φφ        LDAA    φ,X       ;GET FIRST BYTE OF ENTRY
φ3Dφ   97   34Z       STAA    DISDIG    ;PUT IT INTO FIRST BYTE OF DISDIG
```

-continued

```
φ3D2   A6   φ1        LDAA   1,X
φ3D4   97   35Z       STAA   DISDIG+1
φ3D6   A6   φ2        LDAA   2,X
φ3D8   97   36Z       STAA   DISDIG+2
φ3DA   BD   φ28D      JSR    UPKDIG      ;UNPACK DISDIG INTO THE DISPLAY
φ3DD   39             RTS
                 ;
                 ;    USEFUL ROUTINES
                 ;
φ3DE   φ8        INX3:      INX
φ3DF   φ8        INX2:      INX
φ3Eφ   φ3             INX
φ3E1   39             RTS
                 ;
φ3E2   φ9        DEX3:      DEX
φ3E3   φ9        DEX2:      DEX
φ3E4   φ9             DEX
φ3E5   39             RTS
                 ;
φ3F6   48        ASLA4:     ASLA
φ3E7   48        ASLA3:     ASLA
φ3E8   48        ASLA2:     ASLA
φ3E9   48             ASLA
φ3EA   39             RTS
                 ;
φ3EB   44        LSRA4:     LSRA
φ3EC   44        LSRA3:     LSRA
φ3ED   44        LSRA2:     LSRA
φ3EE   44             LSRA
φ3EF   39             RTS
                 ;
                 ;    DOSUM
                 ;
                 ;    DOSUM RETURNS THE CHECK SUM OF CMOS MEMORY FROM
                 ;    LOCATION #SUM+2 TO LOCATION ENDMEM IN ACCS A AND B
                 ;****************
φ3Fφ   CE   φφφ2  DOSUM:     LDX      #SUM+2   ;FIRST ADDRESS FOR CHECK SUM
φ3F3   4F             CLRA
φ3F4   5F             CLRB
φ3F5   EB   φφ    LOOP1:     ADDB     φ,X      ;ADD BYTE TO B
φ3F7   99   φφ        ADCA   φ                 ;ADD CARRY OUT TO A
φ3F9   φ8             INX                      ;GO TO NEXT BYTE
φ3FA   9C   32Z       CPX    ENDMEM            ;PAST END OF MEMORY?
φ3FC   26   F7 =      BNE    LOOP1
                 ;
φ3FE   43             COMA                     ;COMPLEMENT RESULT
φ3FF   53             COMB
φ4φφ   39             RTS
                 ;
                 ;    CHKSUM
                 ;
                 ;    CHKSUM COMPARES THE CHECK SUM OF MEMORY TO THE
                 ;    VALUES STORED IN LOCATIONS SUM AND SUM + 1. IF
                 ;    THE SUM IS DIFFERENT CARRY IS SET TO 1 ELSE
                 ;    CARRY IS ZERO.
                 ;
φ4φ1   BD   φ3Fφ  CHKSUM:    JSR      DOSUM    ;GET CHKSUM OF CMOS MEMORY
φ4φ4   B1   φφφφ      CMPA   SUM               ;CHECK FIRST BYTE
φ4φ7   26   φ7 =      BNE    CHKERR            ;TOO BAD
φ4φ9   F1   φφφ1      CMPB   SUM+1             ;SECOND BYTE
φ4φC   26   φ2 =      BNE    CHKERR
φ4φE   φC             CLC                      ;CARRY = φ MEANS OK
φ4φF   39             RTS
                 ;
φ41φ   φD         CHKERR:    SEC               ;CARRY = 1 MEANS FAIL
φ411   39             RTS
                 ;
                 ;    SETSUM
                 ;
                 ;    SETSUM PUTS THE CHECK SUM OF MEMORY INTO
                 ;    LOCATIONS SUM AND SUM + 1
                 ;
φ412   BD   φ3Fφ  SETSUM:    JSR      DOSUM    ;GET CHECK SUM OF MEMORY
φ415   B7   φφφφ      STAA   SUM               ;STORE FIRST BYTE
φ418   F7   φφφ1      STAB   SUM+1             ;SECOND TOO
φ41B   39             RTS
                 ;
                 ;
                 ; ROUTINE TO SEE IF SYS CODE IN DIGTAB IS OK
                 ; RETURNS Z=1 IF OK
            φ41CP CHKSYS     =        *
φ41C   96   C5        LDAA   S.SYS
```

-continued

```
φ41E  84   φF        ANDA    #$φF
φ42φ  91   3φZ       CMPA    DIGTAB+6
φ422  26   φ8 =      BNE     SYSRET     ;BAD NEWS
                   ; NOW FOR HIGHER DIGIT
φ424  96   C5        LDAA    S.SYS
φ426  44             LSRA
φ427  44             LSRA
φ428  44             LSRA
φ429  44             LSRA
φ42A  91   2FZ       CMPA    DIGTAB+5
φ42C  39           SYSRET:   RTS
                   ; FRTL CHECKS TO SEE IF THIS CARD IS THE SAME
                   ; AS THE LAST ONE. IF IT IS NOT (AND IT HAS A VALID
                   ; SYSTEM CODE) THEN WE STORE THIS AS THE NEW
                   ; COMPARAND AND CLEAR THE COUNT OF ERROR TRIES
                   ;*
           φ42DP   FRTL      =          *
φ42D  BD   φ41C      JSR     CHKSYS
φ43φ  26   φC =      BNE     FRTS       ;BAD SYS CODE
                   ;
φ432  CE   φφφ5      LDX     #$φφφ5     ;FIVE DIGS IN RTLBUF
φ435  A6   29Z     FRTLL:    LDAA       DIGTAB-1,X
φ437  A1   39Z       CMPA    RTLBUF-1,X
φ439  26   φ4 =      BNE     NEWFRT
φ43P  φ9             DEX
φ43C  26   F7 =      BNE     FRTLL
                   ; IT WAS THE SAME
φ43E  39           FRTS:     RTS
                   ;
φ43F  A6   29Z     NEWFRT:   LDAA       DIGTAB-1,X
φ441  A7   39Z       STAA    RTLBUF-1,X
φ443  φ9             DEX
φ444  26   F9 =      BNE     NEWFRT
                   ;
φ446  7F   φφ3F      CLR     NTRIES
φ449  39             RTS
                   ;
                   ; ROUTINE TO CHECK DURESS FLAG
                   ; TRIGGERS RELAY IF SET
           φ44AP   DURESS    =          *
φ44A  96   81        LDAA    FPROM+1
φ440  84   2φ        ANDA    #O.DUR
φ44E  27   φE =      BEQ     NODUR      ;HE DIDN'T BUY THE DURESS OPTION
                   ;
φ45φ  96   1CZ       LDAA    DURESF
φ452  27   φA =      BEQ     NODUR      ;HE DIDN'T COMPLAIN
                   ;
φ454  86   4φ        LDAA    #R.DUR
φ459  CE   FC7C      LDX     #T.φ3S
φ45C  DF   φCZ       STX     DUCNTR
φ45E  39           NODUR:    RTS
                   ;
                   ;
                   ;
                   ;   ROUTINE TO CHECK IDEK PASSWORD
                   ;   RETURNS WITH CARRY = 1 IF OK
                   ;   CARRY = φ IF BAD
                   ;
                   ;   CALLS MIX TO RECALCULATE COMBINATION FUNCTION
                   ;   ASSUMES CARD IMAGE IN DIGTAB
                   ;   AND PASSWORD IN KEYTAB
                   ;
                   ;   MIXPTR IS A CALCULATED INDEX INTO DIGTAB
                   ;   COMBX IS AN INDEX INTO MASTER
                   ;   WE PROCESS THE DIGITS OF THE PASSWORD IN ORDER
                   ;
           φ45FP   COMBIN    =          *
φ45F  BD   φ482      JSR     MIX        ;TABLE OF DIGIT INDICES IN 'MASTER'
φ462  7F   φφ4A      CLR     MIXPTR     ;MSB OF XREG
φ465  CE   φφφφ      LDX     #φ         ;FIRST DIGIT OF PASSWORD
φ468  A6   21Z     COMBL:    LDAA       MASTER,X
φ46A  DF   48Z       STX     COMBX
φ46C  97   4BZ       STAA    MIXPTR+1
φ46E  DF   4AZ       LDX     MIXPTR
                   ; NOW X INDICATES WHICH DIGIT OF HIS
                   ; CARD FORMS THIS DIGIT OF THE PASSWORD
φ47φ  A6   2AZ       LDAA    DIGTAB,X
φ472  DE   48Z       LDX     COMBX
φ474  A1   14Z       CMPA    KEYTAB,X
φ476  26   φ8 =      BNE     COMBAD
φ478  φ8             INX
φ479  8C   φφφ3      CPX     #3
```

-continued

```
ϕ47C    26    EA =     BNE      COMBL
ϕ47E    ϕD             SEC
ϕ47F    39             RTS
                    ;
ϕ48ϕ    ϕC          COMBAD:     CLC
ϕ481    39             RTS
                    ;
                    ;
                    ; SUBROUTINE TO PREPARE COMPARAND
                    ; TABLE FOR IDEK PERSONAL CODE
                    ;
                    ; THE IDEK CODE IS 4 DIGITS TAKEN FROM THE CARDHOLDER'S
                    ; 5 DIGIT CODE IN AN ARBITRARY ORDER
                    ;
                    ; SO WE HAVE ALL COMBINATIONS OF FIVE THINGS
                    ; TAKEN FOUR AT A TIME
                    ; >>>12ϕ<<<
                    ; SPECIFY WHICH OF THE FIVE IS MISSING (3 BITS)
                    ; >>>24<<<
                    ; SPECIFY WHICH OF THE FOUR APPEARS FIRST (2 BITS)
                    ; >>>6<<<
                    ; SPECIFY WHICH COMES NEXT (2 BITS)
                    ; >>>2<<<
                    ; TAKE THE REMAINING TWO IN ORDER, OR REVERSED (1 BIT)
                    ;
                    ; BIT MEANINGS:
                    ; TTHE PERM/COMB SWITCH HAS FOUR FIELDS,
                    ; IN THIS FORM: (MMMFFSSX)
                    ; WHERE MMM INDICATES WHICH IS MISSING
                    ; FF. . .WHICH COMES FIRST
                    ; SS. . .WHICH COMES SECOND
                    ; X . . .=1 IF LAST SHOULD BE FLIPPED
                    ;
              ;**********************************************
              ;
                    ;
                    ;  RTC
                    ;
                    ;**********************************************
                    ;
                    ;  ALL TASKS WHICH REQUIRE TIME DELAYS AND ALL
                    ;  PARAMETERS REQUIRING CONTINUOUS MONITORING
                    ;  ARE HANDLED BY THIS SET OF ROUTINES.
                    ;  SPECIFICALLY, THIS MODULE HANDLES THE
                    ;  FOLLOWING TASKS:
                    ;
                    ;  DOOR OPEN PUSHBUTTON MONITORING
                    ;  RELAY ACTIVATION SEQUENCES
                    ;  RELAY CLOSURES AFTER TIME DELAY
                    ;  DEAD MAN SET
                    ;  CARD EDGE DETECT
                    ;
                       TITLE "RTC"
                    ;
                    ;  DEFINE MODULE STARTING ADDRESS
                    ;
ϕϕϕϕ                   PSECT
                    ;
ϕϕϕϕ    7E    ϕϕϕC     JMP      RTC
ϕϕϕ3    7E    ϕϕF4     JMP      OPEN
ϕϕϕ6    7E    ϕ1B5     JMP      BLANK
ϕϕϕ9    7E    ϕ15B     JMP      RLYON
                    ;
                    ;
                    ;
                    ;  RTC
                    ;
                    ;
                    ;  THIS IS THE MAIN SERVICE ROUTINE FOR THE REAL
                    ;  TIME CLOCK INTERRUPTS. A RISING EDGE OF THE CLOCK
                    ;  FORCES AN IRQ INTERRUPT WHICH VECTORS TO RTC.
                    ;  RTC IN TURN CALLS SUBROUTINES TO EXECUTE THE
                    ;  VARIOUS TASKS THAT NEED SERVICING ONE AT A TIME.
                    ;
                    ;
             ϕϕϕCP  RTC        =        *
ϕϕϕC    96    4FZ      LDAA     VAREND
ϕϕϕE    26    FE =     BNE      *                  ;STACK OVERFLOW????
                    ;
ϕϕ1ϕ    96    A6       LDAA     BUFB      ;CLR INTERRUPT AT PIA
ϕϕ12    86    38       LDAA     #$38      ;RESET PIA DDR'S
ϕϕ14    97    A5       STAA     CSRA
ϕϕ16    86    ϕA       LDAA     #$ϕA
```

-continued

```
φφ18   97   A7           STAA   CSRB
φφ1A   86   FF           LDAA   #$FF
φφ1C   97   A4           STAA   BUFA
φφ1E   86   FE           LDAA   #$FE
φφ2φ   97   A6           STAA   BUFB
φφ22   86   3C           LDAA   #$3C      ;SET DEAD MAN HIGH
φφ24   97   A5           STAA   CSRA
φφ26   86   φE           LDAA   #$φE
φφ28   97   A7           STAA   CSRB
                    ;
φφ2A   BD   φ174         JSR    KEYSER    ;SCAN KEYBD
φφ2D   BD   φφ3A         JSR    CRDEDG    ;CHK FOR CRD IN
φφ3φ   BD   φφ69         JSR    MUX       ;TEND THE DISPLAY IF NEEDED
φφ33   BD   φφ9φ         JSR    APR       ;CHK DOOR OPEN PUSHBUTTON
φφ36   BD   φφB1         JSR    CNTDN     ;COUNT DOWN SERVICE TIMERS
                    ;
φφ39   3B                RTI              ;RETURN TO BACKGROUND TASK
                    ;
                    ;
                    ;
                    ;    CRDEDG
                    ;
                    ;
                    ;    CHECKS FOR CARD, SETS CRDFLG ACCORDINGLY
                    ;
                    ;    φφ      NO CARD
                    ;    NN      (1<NN<=2φ) CARD IN, BUT BOUNCING
                    ;    φ1      CARD IN, NOT YET PROCESSED
                    ;    FE      CARD IN, ALREADY PROCESSED
                    ;
            φφ3AP   CRDEDG      =         *
φφ3A   96   12Z          LDAA   EDMODE    ;ARE WE EDITING?
φφ3C   26   2A =         BNE    CRDDN     ;YES; IGNORE CARDS
φφ3E   96   11Z          LDAA   CRDFLG
φφ4φ   26   11 =         BNE WASIN
                    ; HERE IF THE CARD WAS NOT IN LAST TIME
φφ42   96   A6           LDAA   BUFB
φφ44   84   φ1           ANDA   #$φ1
φφ46   27   2φ=          BEQ    CRDDN
φφ48   86   2φ           LDAA   #$2φ
φφ4A   97   11Z          STAA   CRDFLG    ;PUT DEBOUNCE CNT INTO CRDFLG
                    ;
φφ4C   7F   φφ1B         CLR    KEYCNT    ;IDEK ENTRY START OVER
φφ4F   7F   φφ1C         CLR    DURESF    ;DURESS MUST BE AFTER CARD IN
φφ52   39                RTS
                    ;
                    ;
φφ53   96   A6      WASIN:      LDAA      BUFB      ;FLAG CARD REMOVAL
φφ55   84   φ1           ANDA   #$φ1
φφ57   27   φC =         BEQ    CRDCLR    ;CARD REMOVED
                    ; HERE IF CARD STILL IN
φφ59   96   11Z          LDAA   CRDFLG
φφ5B   81   FE           CMPA   #$FE                ;CARD PROCESSED?
φφ5D   27   φ9 =         BEQ    CRDDN               ;YES; DO NOT DEBOUNCE
φφ5F   4A                DECA             ;CHECK DEBOUNCE COUNT
φφ6φ   27   φ6 =         BEQ    CRDDN     ;COUNT WAS 1, I.E. STOPPED
φφ62   97   11Z          STAA   CRDFLG
φφ64   39                RTS
                    ;
            φφ65P   CRDCLR      =         *
φφ65   7F   φφ11         CLR    CRDFLG
                    ;
φφ68   39           CRDDN:      RTS
                    ;
                    ;
                    ;    EDITOR DISPLAY MULTIPLEXER
                    ;    CALL HERE ONCE A TICK TO CHANGE THE DISPLAY
                    ;    THIS ROUTINE IS HIGHLY NON-REENTRANT
                    ;    INDEED, IT OUTPUTS A DIFFERENT DIGIT EACH
                    ;    TIME IT IS CALLED.
                    ;
            φφ69P   MUX         =         *
φφ69   96   12Z          LDAA   EDMODE    ;SHOULD THE DISPLAY BE LIT?
φφ6B   27   FB =         BEQ    CRDDN     ;;NO
φφ6D   96   4DZ          LDAA   MUXPTR+1
φφ6F   48                ASLA
φφ7φ   97   4EZ          STAA   MUXTMP
φφ72   D6   A6           LDAB   BUFB
φφ74   C4   F1           ANDB   #$F1
φφ76   DA   4EZ          ORAB   MUXTMP
                    ; B CONTAINS DIGIT#
                    ; NOW GET DATA FOR THIS DIGIT
```

-continued

```
ϕϕ78   96   A4         LDAA   BUFA
ϕϕ7A   84   Fϕ         ANDA   #$Fϕ
ϕϕ7C   DE   4CZ        LDX    MUXPTR
ϕϕ7E   AA   14Z        ORAA   KEYTAB,X
ϕϕ8ϕ   97   A4         STAA   BUFA
ϕϕ82   D7   A6         STAB   BUFB
                  ;
ϕϕ84   ϕ9              DEX
ϕϕ85   8C   ϕϕϕϕ       CPX    #ϕ          ;DEX DOESN'T SET FLAGS NICELY!
ϕϕ88   2A   ϕ3 =       BPL    *+5
ϕϕ8A   CE   ϕϕϕ5       LDX    #$ϕϕϕ5
ϕϕ8D   DF   4CZ        STX    MUXPTR
ϕϕ8F   39              RTS
                  ;
                  ;
                  ;
                  ;    APB
                  ;
                  ;
                  ;    CHECKS DOOR OPEN PUSHBUTTON. CAUSES DOOR OPEN
                  ;    SEQUENCE WHEN CLOSURE IS DETECTED IF PUSHER'S
                  ;    FINGER HAS RIGHT SYSTEM CODE
                  ;
ϕϕ9ϕ   96   8ϕ    APB:        LDAA      FPROM     ;CHK FOR AS OPTION
ϕϕ92   84   2ϕ         ANDA   #O.AS
ϕϕ94   27   1A =       BEQ    APBD
                  ;
ϕϕ96   96   1ϕZ        LDAA   APBFLG      ;IGNORE SWITCH IF
ϕϕ98   26   ϕD =       BNE    APX         ;ALREADY SERVICED
                  ;
ϕϕ9A   96   C3         LDAA   S.XXX       ;OPEN DOOR IF SWITCH
ϕϕ9C   84   8ϕ         ANDA   #X.AS       ;IS PUSHED
ϕϕ9E   26   1ϕ =       BNE    APBD
ϕϕAϕ   BD   ϕϕF4       JSR    OPEN
ϕϕA3   7C   ϕϕ1ϕ       INC    APBFLG      ;FLAG AS SERVICED
ϕϕA6   39              RTS
                  ;
ϕϕA7   96   C3    APX:        LDAA      S.XXX     ;CLR FLAG WHEN SWITCH
ϕϕA9   84   8ϕ         ANDA   #X.AS       ;IS RELEASED
ϕϕAB   27   ϕ3 =       BEQ    APBD
ϕϕAD   7F   ϕϕ1ϕ       CLR    APBFLG
                  ;
ϕϕBϕ   39         APBD:       RTS
                  ;
                  ;
                  ;
                  ; CNTDN
                  ;
                  ; EVERY TASK INVOLVING A TIME DELAY HAS A
                  ; COUNTER ASSOCIATED WITH IT. THESE TWO BYTE
                  ; COUNTERS ARE LOADED WITH A NUMBER TO ACTIVATE
                  ; THEM. EACH COUNTER THEN INCREMENTS ON EACH
                  ; CLOCK TICK UNTIL IT OVERFLOWS, AT WHICH TIME
                  ; A COMPLETION ROUTINE IS CALLED TO TAKE THE
                  ; APPROPRIATE ACTION.
                  ;
                  ; YOU SHOULD ALSO BE AWARE THAT EACH
                  ; COMPLETION ROUTINE IS CALLED WITH A VALUE IN AC A
                  ; EQUAL TO 2   N WHERE N IS THE VECTOR SLOT NUMBER
                  ; OF THAT ROUTINE.
                  ; THIS MAKES FOR SIMPLIFIED RLYOFF CALLS
                  ;
ϕϕB1   CE   ϕϕϕϕ  CNTDN:      LDX       #$ϕϕϕϕ    ;SET LOOP INDICES
ϕϕB4   86   ϕ1    LDAA        #$ϕ1
                  ;
ϕϕB6   6D   ϕϕZ   CNTDNL: TST           CNTRS,X   ;CLOCK EACH COUNTER
ϕϕB8   27   1D =       BEQ    CNTDNS      ;UNLESS ITS ALREADY
ϕϕBA   6C   ϕ1Z        INC    CNTRS+1,X             ;ZERO
ϕϕBC   26   19 =       BNE    CNTDNS
ϕϕBE   6C   ϕϕZ        INC    CNTRS,X
ϕϕCϕ   26   15 =       BNE    CNTDNS
                  ;
ϕϕC2   36              PSHA
ϕϕC3   DF   4ϕZ        STX    XREGϕ       ;IF COUNTER OVERFLOWS
ϕϕC5   86   ??         LDAA   #MSB SERV             ;TO ZERO, CALL ASSOCIATED
ϕϕC7   97   4ϕZ        STAA   XREGϕ       ;SERVICE ROUTINE
ϕϕC9   DE   4ϕZ        LDX    XREGϕ
ϕϕCB   EE   ??         LDX    LSB SERV,X
ϕϕCD   32              PULA
ϕϕCE   36              PSHA
ϕϕCF   AD   ϕϕ         JSR    ϕ,X
ϕϕD1   4F              CLRA
```

-continued

```
ϕϕD2  97  4ϕZ       STAA   XREGϕ
ϕϕD4  DE  4ϕZ       LDX    XREGϕ
ϕϕD6  32            PULA
                  ;
ϕϕD7  ϕ8          CNTDNS: INX                              ;INCREMENT LOOP INDICE
ϕϕD8  ϕ8              INX                           ;LOOP UNTIL ALL CNTRS SERVICED
ϕϕD9  48              ASLA                  ;SHIFT BIT TO NEXT PLACE
ϕϕDA  8C  ϕϕ1ϕ        CPX    #NCNTRS
ϕϕDD  26  D7 =        BNE    CNTDNL
                  ;
                  ;   SERVICE TABLE
                  ;
          ϕϕEϕP   SERV       =          *
ϕϕEϕ                  WORD   GOON
ϕϕE2                  WORD   GOOFF
ϕϕE4                  WORD   GXOFF
ϕϕE6                  WORD   EDEND
ϕϕE8                  WORD   RLYOFF     ;EROFF
ϕϕEA                  WORD   RLYOFF     ;ASOFF
ϕϕEC                  WORD   RLYOFF     ;DUOFF
ϕϕEE                  WORD   RTS3       ;FOR PATCHING
                  ;
                  ;
                  ; THIS ROUTINE IS CALLED WHEN
                  ; THE EDITOR HAS DONE NOTHING FOR A WHOLE MINUTE
                  ; SO WE LEAVE EDIT MODE
                  ;
          ϕϕFϕP   EDEND      =          *
ϕϕFϕ  7F  ϕϕ12        CLR    EDMODE
ϕϕF3  39              RTS
                  ;
                  ;   OPEN
                  ;
                  ;
                  ;   STARTS DOOR OPEN SEQUENCE.
                  ;   TURNS ON ALARM SHUNT, WAKES UP GOON TO TURN
                  ;   ON GO RELAY AFTER 5ϕ MILLISECOND DELAY.
                  ;
ϕϕF4  96  8ϕ      OPEN:      LDAA       FPROM    ;CHECK 'AS' OPTION,LEAVE
ϕϕF6  84  2ϕ          ANDA   #O.AS      ;RELAY OFF UNLESS IN
ϕϕF8  27  ϕ5 =        BEQ    OPENS
                  ;
ϕϕFA  86  2ϕ          LDAA   #R.AS      ;TURN ON 'AS' RELAY
ϕϕFC  BD  ϕ15B        JSR    RLYON
                  ;
ϕϕFF  BD  ϕ14B    OPENS:     JSR        NOTIME   ;TURN OFF CONFLICTING TIMERS
ϕ1ϕ2  CE  FFFϕ        LDX    #T.5ϕMS    ;WAKE UP GOON IN 5ϕ MS
ϕ1ϕ5  DF  ϕϕZ         STX    OPCNTR
                  ;
ϕ1ϕ7  39          OPEND:     RTS
          ϕ1ϕ7P   RTS3       =          OPEND
                  ;
                  ;
                  ;   GOON
                  ;
                  ;   TURN ON GO RELAY
                  ;   ENABLE EITHER GOOFF OR GXOFF TO
                  ;   TURN IT OFF LATER
                  ;
                  ;   "COME IN, TAILOR. HERE YOU MAY ROAST YOUR GOOSE."
                  ;
                  ;
ϕ1ϕ8  86  8ϕ      GOON;      LDAA       #R.GO    ;ACTIVATE RELAY
ϕ1ϕA  BD  ϕ15B        JSR    RLYON
                  ;
ϕ1ϕD  CE  ϕϕϕ2        LDX    #GOCNTR    ;SET DELAY ACORDING
ϕ11ϕ  96  C6          LDAA   S.VTD      ;TO VTD SWITCHES IF
ϕ112  84  ϕF          ANDA   #$ϕF       ;VTD NOT ZERO
ϕ114  27  ϕ4 =        BEQ    GOONX
ϕ116  BD  ϕ16ϕ        JSR    CALCT
ϕ119  39              RTS
                  ;
ϕ11A  86  FF      GOONX:     LDAA       #$FF     ;WHEN VTD IS ZERO,
ϕ11C  97  ϕ4Z         STAA   GXCNTR     ;ENABLE ROUTINE TO
ϕ11E  97  ϕ5Z         STAA   GXCNTR+1   ;CLOSE GO RELAY AS SOON
                  ;                     ;AS CARD IS REMOVED
ϕ12ϕ  39          GOOND:     RTS
                  ;
                  ;
                  ; GOOFF
                  ;
                  ; "I PRAY YOU, REMEMBER THE PORTER"
```

```
                        ;
                        ; WHEN 'GO' RELAY TIMES OUT, WE MUST KEEP
                        ; THE AS RELAY CLOSED AWHILE LONGER
                        ; TIME SPECIFIED BY THE AS/DOD SWITCHES
                        ;
φ121  86  8φ            GOOFF:  LDAA    #R.GO
φ123  BD  φ155             JSR     RLYOFF   ;CLOSE 'GO' RELAY
                        ;
φ126  96  C6               LDAA    S.AS             ;READ AS/DOD SWITCHES
φ128  44                   LSRA
φ129  44                   LSRA
φ12A  44                   LSRA
φ12B  44                   LSRA
φ12C  4C                   INCA    ;AS=φ MEANS SHORTEST TIME
φ12D  48                   ASLA
                        ;
                        ;  AT THIS POINT, AC CONTAINS φφφXXXXφ
                        ;
φ12F  CE  φφφA             LDX     #ASCNTR  ;LOAD 'AS' COUNTER
φ131  BD  φ16φ             JSR     CALCT    ;ACCORDING TO SWITCHES
                        ;
φ134  39                   RTS
                        ;
                        ;
                        ;  GXOFF
                        ;
                        ;
                        ;  CHECKS IF CARD STILL IN SLOT.
                        ;  IF NOT, DISABLES GO IMMEDIATELY
                        ;  IF SO, WAKES ITSELF UP ON NEXT CLOCK.
                        ;
                        ;  "I'LL DEVIL PORTER IT NO LONGER"
                        ;
                        ;
          φ135P         GXOFF   =       *
φ135  96  A6               LDAA    BUFB     ;CHECK FOR CARD
φ137  84  φ1               ANDA    #φ1
φ139  26  φ9 =             BNE     STILL
                        ; KEEP IT ON IF A.S. BUTTON IS PUSHED
φ13B  96  C3               LDAA    S.XXX
φ13D  84  8φ               ANDA    #X.AS
φ13F  27  φ3 =             BEQ     STILL
                        ; GO CLOSE GO AND THEN AS RELAYS
φ141  7E  φ121             JMP     GOOFF
                        ; HERE IF WE WANT TO STAY OPEN
φ144  86  FF            STILL:  LDAA    #$FF      ;WAKE ME UP AT
φ146  97  φ4Z              STAA    GXCNTR   ;NEXT CLOCK TICK
φ148  97  φ5Z              STAA    GXCNTR+1
                        ;
φ14A  39                GXD:    RTS
                        ;
                        ;
                        ; NOTIME TURNS OFF A WHOLE SLEW OF COUNTERS
                        ; CALL HERE WHEN YOU START A 'GO SEQUENCE'
                        ; SO THAT YOUR PREDECESSORS CANNOT INTERFERE WITH YOU
                        ;
φ14B  CE  φφφφ          NOTIME: LDX             #φ
φ14E  DF  φAZ              STX     ASCNTR
φ15φ  DF  φ2Z              STX     GOCNTR
φ152  DF  φφZ              STX     OPCNTR
φ154  39                   RTS
                        ;
                        ;  RLYOFF
                        ;
                        ;
                        ; RLYOFF CLOSES THE RELAY INDICATED
                        ; BY MASK (E.G. $8φ) IN AC A
                        ;
                        ;
          φ155P         RLYOFF  =       *
φ155  43                   COMA
φ156  94  A6               ANDA    BUFB
φ158  97  A6               STAA    BUFB
                        ;
φ15A  39                   RTS
                        ;
                        ;
                        ;  RLYON  ;TURNS ON A RELAY
                        ;         ;BIT MASK E.G. $8φ IN AC A
                        ;
          φ15BP         RLYON   =       *
φ15B  9A  A6               ORAA    BUFB
```

-continued

```
φ15D   97   A6        STAA   BUFB
                   ;
                   ;
                   ;  CALCT
                   ;
                   ;
                   ;
                   ;  CALCULATE TIMER CONSTANT FROM VALUE
                   ;  IN ACCUM A. ACCUM A CONTAINS TIME IN SECONDS,
                   ;  X POINTS TO TIMER.
                   ;
                   ;
φ16φ   6F   φφ     CALCT:  CLR    φ,X          ;ACCUMULATE TIMER CONST.
φ162   6F   φ1        CLR    1,X               ;IN XREG2
                   ;
                   ;
φ164   E6   φ1     CALCTL: LDAB   1,X          ;SUBTRACT ONE SECOND
φ166   Cφ   2C        SUBB   #LSB (-T.φ1S)     ;EACH TIME THRU LOOP
φ168   E7   φ1        STAB   1,X
φ16A   E6   φφ        LDAP   φ,X
φ16C   C2   φ1        SBCB   #MSB (-T.φ1S)     ;MSB
φ16E   E7   φφ        STAB   φ,X
                   ;
φ17φ   4A             DECA                     ;GO THRU LOOP UNTIL
φ171   26   F1 =      BNE    CALCTL            ;ACCUM A COUNTED OUT
                   ;
                   ;
φ173   39             RTS                      ;RETURN WITH TIMER
                                               ;CONST. IN X
                   ;
                   ;
                   ;  KEYSER
                   ;
                   ;
                   ;  MAIN KEYBOARD SERVICE ENTRY,
                   ;  CALL HERE AT RTC TO CHECK KEYBOARD
                   ;  CONTINUALLY SHOVES NEW KEYS INTO KEYTAB
                   ;  CALLS DEBOUNCE AND STASH ETC..
                   ;
                   ;
            φ174P  KEYSER  =      *
φ174   BD   φ17E      JSR    DB                ;WHAT HAS BEEN PUSHED?
φ177   4D             TSTA                     ;FF MEANS NOTHING
φ178   2B   φ3 =      BMI    NOKEY
φ17A   BD   φ199      JSR    STASH             ;PUT INTO MEMORY
                   ;
φ17D   39          NOKEY:  RTS
                   ;
                   ;
                   ;  DEBOUNCE
                   ;
                   ;  RETURNS # OF KEY IN AC A
                   ;  RETURNS FF IF NO NEW KEYS THIS TIME
                   ;
                   ;  USES SUBR KEYSCAN
                   ;
            φ17EP  DB =    *
φ17E   BD   φ1D4      JSR    KEYSCN            ;GET NEW KEY IN B
φ181   96   2φZ       LDAA   OLDKEY
φ183   D7   2φZ       STAB   OLDKEY            ;SAVE THIS # FOR NEXT TIME
                   ;                           ;A CONTAINS ONLY COPY OF OLD ONE
φ185   11             CBA
φ186   27   φ6 =      BEQ    OLDIE
                   ;  HERE IF WE SEE KEY FOR FIRST TIME
φ188   7F   φφ1F      CLR    KEYFLG
φ18B   86   FF        LDAA   #$FF              ;DON'T ASSIMILATE UNTIL LATER
φ18D   39             RTS
                   ;  HERE IF SEEN AT LEAST ONCE BEFORE
φ18E   D6   1FZ    OLDIE:  LDAB   KEYFLG
φ19φ   27   φ3 =      BEQ    GOODIE
                   ;  HERE IF SEEN MANY TIMES
φ192   86   FF        LDAA   #$FF
φ194   39             RTS
                   ;
φ195   7A   φφ1F   GOODIE: DEC    KEYFLG       ;NO LONGER VIRGIN
φ198   39             RTS                      ;KEY # IN AC A STILL
                   ;
                   ;
                   ;  STASH    ;PROCESS KEYBOARD CHARS
                   ;
                   ;  IF A NUM, STORES IT INTO KEYTAB
                   ;  AND INCREMENTS KEYCNT
                   ;  IF DURESS, SETS DURESF FLAG
```

-continued

```
                         ;
                         ; CALLED WITH CHAR IN AC A
                         ;
              φ199P      STASH      =          *
                         ; FIRST FOR THE SPECIAL CHECKS
                         ;
φ199   81     φA            CMPA      #$φA                    ;DURESS CHARACTER
φ19B   27     2E =          BEQ       DURKEY
φ19D   2A     2F =          BPL       CMDKEY     ;1φ AND UP ARE CMDS
                         ; HERE IF IT IS A PLAIN NUMBER
φ19F   7D     φφ1E          TST       POISON
φ1A2   27     φ3 =          BEQ       *+5
φ1A4   BD     φ1B5          JSR       BLANK      ;FIRST CHAR AFTER CMD CLEARS DISPLAY
                         ; SEE IF THERE IS ROOM
φ1A7   D6     1BZ           LDAB      KEYCNT
φ1A9   C1     φ6            CMPB      #$φ6
φ1AB   27     φ7 =          BEQ       RTS4       ;DISPLAY ALREADY FULL
                         ; OK, STICK IT IN
φ1AD   5C                   INCP
φ1AE   D7     1BZ           STAB      KEYCNT
φ1Bφ   DE     1AZ           LDX       KEYPTR     ;WHICH IS KEYCNT-1
φ1B2   A7     13Z           STAA      KEYTAB-1,X
φ1B4   39                RTS4:        RTS
                         ;
                         ; HERE TO BLANK OUT THE WHOLE DISPLAY
                         ; KRUMPS X AND B
              φ1B5P      BLANK      =          *
φ1B5   D6     A6            LDAB      BUFB
φ1B7   CA     φE            ORAB      #$φE
φ1B9   D7     A6            STAB      BUFB
                         ;
φ1BB   CE     φFφF          LDX       #$φFφF
φ1BE   DF     14Z           STX       KEYTAB
φ1Cφ   DF     16Z           STX       KEYTAB+2
φ1C2   DF     18Z           STX       KEYTAB+4
φ1C4   7F     φφ1B          CLR       KEYCNT
φ1C7   7F     φφ1E          CLR       POISON
φ1CA   39                   RTS
                         ;
              φ1CBP      DURKEY     =          *
φ1CB   97     1CZ           STAA      DURESF                  ;MAKE FLAG NON-ZERO
φ1CD   39                   RTS
                         ;
                         ; HERE WHEN WE SEE A CMD KEY
φ1CE   97     1DZ        CMDKEY: STAA          CMDBYT
φ1Dφ   7C     φφ1E          INC       POISON
φ1D3   39                   RTS
                         ;
                         ;
                         ;  KEYSCAN
                         ;
                         ; TELLS WHAT KEY IS DOWN
                         ; ANSWER IS IN AC B
                         ; φ THROUGH $2A DESIGNATES KEY
                         ; $1φ THROUGH $1A DESIGNATES SHIFTED CONTROL KEY
                         ; FF MEANS NO KEYS PUSHED
                         ;
              φ1D4P      KEYSCN     =          *
φ1D4   5F                   CLRB                 ;START WITH KEY φ
                         ;
                         ; DETERMINE WHAT ROW THE KEY IS IN
                         ;
φ1D5   96     Eφ            LDAA      ROWφ
φ1D7   43                   COMA
φ1D8   84     Fφ            ANDA      #$Fφ       ;UNUSED BITS
φ1DA   26     15 =          BNE       GOTIT
φ1DC   CB     φ4            ADDB      #4                      ;NEXT ROW STARTS WITH KEY 4
                         ;
φ1DE   96     E1            LDAA      ROWφ+1
φ1Eφ   43                   COMA
φ1E1   84     Fφ            ANDA      #$Fφ
φ1E3   26     φC =          BNE       GOTIT
φ1E5   CB     φ4            ADDB      #4
                         ;
φ1E7   96     E2            LDAA      ROWφ+2
φ1E9   43                   COMA
                         ;  ANDA      #$Fφ
φ1EA   84     7φ            ANDA      #$7φ                    ;TRASH BIT FROM SHIFT KEY
φ1EC   26     φ3 =          BNE       GOTIT
                         ; HERE IF NOW ROWS HAVE KEYS DOWN
φ1EE   C6     FF            LDAB      #$FF
φ1Fφ   39                   RTS
```

-continued

```
                         ;
                         ; NOW TO DETERMINE WHICH OF THE FOUR COLUMNS IT IS
                         ; AT THIS POINT, B CONTAINS φ, 4, OR 8
                         ; AND A CONTAINS A 'ONE-OF-FOUR' CODE IN THE MSB'S
                         ; THE CODE FOR KEY φ IS 1φ; KEY 1 is 2φ, ETC.
                         ;
              φ1F1P      GOTIT      =       *
φ1F1    44                  LSRA
φ1F2    44                  LSRA
φ1F3    44                  LSRA
φ1F4    44                  LSRA
                         ; NOW CODE IS THE THE FOUR LSB'S
φ1F5    44               KEYSL:     LSRA                     ;PUT A BIT INTO CARRY
                                      FLAG
φ1F6    25    φ3=           BCS     DONKEY   ;IF A ONE, THEN WE'RE THROUGH
φ1F8    5C                  INCB             ;NOPE. . .GO TO NEXT BIT
φ1F9    2φ    FA=           BRA     KEYSL    ;LOOP UNTIL FIND ONE
                         ; NOTE THAT WE ARE GUARANTEED THAT AC IS NON-ZERO!!!
                         ; HERE WITH NUMERIC IN AC B
                         ; SEE IF SHIFT KEY IS PUSHED
φ1FB    7D    φφE2          TST     ROWφ+2
φ1FE    2B    φ2 =          BMI     *+4                      ;SKIP IF NOT PUSHED
φ2φφ    CA    1φ            OPAB    #$1φ     ;ADD IN SHIFT BIT
φ2φ2    39                  RTS
                         ;
```

What is claimed is:

1. A terminal for providing stand-alone security for selectively limiting access at a remote location, comprising:

means responsive to magnetically coded indicia on a card for reading and storing an indentification number peculiar to the holder of said card;

a memory at said terminal for storing a plurality of said identification numbers;

means for comparing said identification number stored by said reading and storing means with said identification numbers stored in said memory, and for providing selective access based on said comparison; and means for adding and deleting identification numbers at said memory without affecting the total identification number storage capacity of said memory.

2. A terminal for providing stand-alone security, as defined in claim 1, wherein said means for adding and deleting numbers comprises means for adding numbers at said memory in numerical order.

3. A terminal for providing stand-alone security, as defined in claim 2, wherein said means for adding and deleting identification numbers shifts all numbers in said memory which are greater than an added number by one memory location to make room for added numbers.

4. A terminal for providing stand-alone security, as defined in claim 3, wherein said means for adding and deleting identification numbers shifts all numbers greater than the number deleted from said memory by one memory location so that the group of data in said memory does not include unused memory locations after deletion of identification numbers therefrom.

5. A terminal for providing stand-alone security, as defined in claim 1, wherein said means for comparing said identification number stored by said reading and storing means with said identification numbers stored in said memory comprises means for conducting a binary search in said memory.

6. A terminal for providing stand-alone security, as defined in claim 1, wherein said means for adding and deleting identification numbers comprises a keyboard connected to a memory control circuit for changing numbers stored in said memory, said keyboard additionally used for providing selective access at said terminal.

7. A terminal for providing stand-alone security, as defined in claim 1, additionally comprising:

means for comparing said identification number stored in said memory with the real time to provide selective time-based access at said terminal.

8. A terminal for providing selective personnel access at a remote location, comprising:

a memory storing plural personnel identification numbers, each associated with a time code stored in said memory;

plural independently adjustable real-time monitors for providing timing signals at times independently selected for each such monitor;

means for sensing a data card to provide signals identifying personnel;

means for comparing said signals identifying personnel with identification numbers stored in said memory to provide said associated time code; and means for comparing said associated time code with each of said plural real-time monitors to provide selective access.

9. A terminal for providing selective personnel access at a remote location, as defined in claim 8, wherein said means for comparing said associated time code with each of said plural real-time monitors permits selective access to personnel at times independently selected for more than one of said monitors.

10. A terminal for providing selective personnel access at a remote location, as defined in claim 8, wherein said means for comparing said signals identifying personnel with identification numbers stored in said memory is at a location remote from said real-time monitors.

11. A terminal for use in providing selective access at a remote location, comprising:

a memory storing identification numbers of persons;

means responsive to cards for accessing the identification number of persons wishing access;

means for comparing identification numbers accessed from said cards with (a) a memory at a central processor if communication lines to said central processor are functioning; and (b) said identification numbers in said memory if said communication lines are not functioning; and means for adding and deleting individual identification numbers from said memory.

12. A terminal for use in providing selective access at a remote location, as defined in claim 11, wherein said means for adding and deleting individual identification numbers from said memory functions without altering the capacity of said memory.

13. A terminal for use in providing selective access atza remote location, as defined in claim 11, wherein said means for adding and deleting identification numbers from said memory organizes said memory so that said identification numbers are in numerical order therein without empty memory locations within the numerical order sequence.

14. A terminal for providing secured access at a remote location, comprising:

means for reading entry card data; a programmable memory for storing data identifying personnel to be provided access;

means for comparing said memory data with said card data to provide selective access; and means for bypassing said memory to compare said card data with a central memory for providing selective access.

* * * * *